US005333059A

United States Patent [19]

Hyosu et al.

[11] Patent Number: 5,333,059

[45] Date of Patent: Jul. 26, 1994

[54] ELECTROSTATIC IMAGING APPARATUS AND FACSIMILE APPARATUS EMPLOYING TONER WITH LOW ALDEHYDE CONTENT

[75] Inventors: Yoshihiko Hyosu, Machida; Seiichi Takagi, Yokohama; Hiroyuki Suematsu, Yokohama; Manabu Ohno, Yokohama; Tetsuhito Kuwashima, Yokohama; Eiichi Imai, Narashino; Yoshinobu Nagai, Kobe, all of Japan

[73] Assignee: Canon Kabushiki Kaisha, Tokyo, Japan

[21] Appl. No.: 857,584

[22] Filed: Mar. 25, 1992

Related U.S. Application Data

[62] Division of Ser. No. 582,328, Sep. 14, 1990, Pat. No. 5,126,224.

[30] Foreign Application Priority Data

Sep. 14, 1989 [JP] Japan ................................ 1-239298

Sep. 14, 1989 [JP] Japan ................................ 1-239299

[51] Int. Cl.[5] ...................... H04N 1/23; G03G 9/083; G03G 9/087

[52] U.S. Cl. ................................ 358/300; 430/106.6; 430/109

[58] Field of Search ..................... 358/300; 430/106.6, 430/109

[56] References Cited

U.S. PATENT DOCUMENTS

| | | | |
|---|---|---|---|
| 3,239,465 | 3/1966 | Rheinfrank | 430/109 |
| 3,577,345 | 5/1971 | Jacknow | 430/109 |
| 3,938,992 | 2/1976 | Jadwin | 430/124 X |
| 4,601,968 | 7/1986 | Hyosu | 430/137 |
| 4,628,019 | 12/1986 | Suematsu | 430/106.6 |
| 4,804,610 | 2/1989 | Mori et al. | 430/137 |
| 4,912,010 | 3/1990 | Mori et al. | 430/157 |
| 4,966,829 | 10/1990 | Yasuda | 430/109 |
| 5,126,224 | 6/1992 | Hyosu et al. | 430/106.6 |

*Primary Examiner*—Benjamin R. Fuller

*Assistant Examiner*—Eric Frahm

*Attorney, Agent, or Firm*—Fitzpatrick, Cella, Harper & Scinto

[57] ABSTRACT

The present invention provide a toner for developing an electrostatic image. The toner comprises a binder resin and a coloring agent. The binder resin comprises a styrene type binder resin. The amount of an aldehyde contained in the binder resin is not more than 0.005% by weight based on the weight of the toner. The binder resin is produced by a process comprising the steps of preparing a monomer composition comprising a polymerizable monomer containing at least not less than 50% by weight of a styrene monomer, and a polymerization initiator, and subjecting said monomer composition to suspension polymerization in an aqueous medium having dissolved oxygen in an amount of not more than 2.5 mg/lit to form a styrene polymer or copolymer containing an aldehyde monomer in an amount of not more than 0.01% by weight.

91 Claims, 3 Drawing Sheets

ELECTROSTATIC IMAGING APPARATUS AND FACSIMILE APPARATUS EMPLOYING TONER WITH LOW ALDEHYDE CONTENT

This application is a division of application Ser. No. 07/582,328 filed Sep. 14, 1990, now U.S. Pat. No. 5,126,224.

BACKGROUND OF THE INVENTION

1. Field of the invention

The present invention relates to a toner for developing an electrostatic image (electrostatically charged image), used in an image forming process such as electrophotography, electrostatic recording or magnetic recording, and a process for producing such a toner. The present invention also relates to a binder resin and a process for producing it.

2. Related Background Art

Methods as disclosed in U.S. Pat. No. 2,297,691, Japanese Patent Publications No. 42-23910 and No. 43-24748 and so forth are conventionally known as electrophotography. In general, copies are obtained by forming an electrostatic latent image on a photosensitive member, utilizing a photoconductive material and according to various means, subsequently developing the latent image by the use of a toner, and transferring the toner image to a transfer medium such as paper if necessary, followed by fixing by the action of heat, pressure, heat-and-pressure, or solvent vapor. In the case when the process comprises toner-image transfer step, the process is usually provided with the step of removing the toner remaining on a photosensitive member.

As developing processes in which an electrostatic latent image is formed into a visible image by the use of a toner, known methods include the magnetic brush development as disclosed in U.S. Pat. No. 2,874,063, the cascade development as disclosed in U.S. Pat. No. 2,618,552, the powder cloud development as disclosed in U.S. Pat. No. 2,221,776, and the method in which a conductive magnetic toner is used, as disclosed in U.S. Pat. No. 3,909,258.

As toners used in these development processes, fine powder obtained by dispersing a dye and/or pigment in a natural or synthetic resin has been hitherto used. For example, particles formed by finely grinding a binder resin such as polystyrene comprising a colorant dispersed therein, to have a size of about 1 to 30 $\mu$ are used as the toner. A toner incorporated with magnetic material particles such as magnetite is also used as the magnetic toner. On the other hand, in a system in which a two-component type developer is used, the toner is used as a mixture with carrier particles such as glass beads, ion powder and ferrite particles.

Nowadays, such recording processes have been widely utilized not only in commonly available copying machines, but also in printers for output information from a computer, or for the printing of microfilms copying from microfilms). Accordingly, a higher performance has become required, and the above recording processes have now been required to simultaneously achieve the improvements in performance such that an apparatus is made small-sized, lightweight, low-energy, high-speed, maintenance-free, and personal. In order to meet these requirements, the needs on toners have become severe in various aspects.

For example, with wide application of the recording processes and wide use thereof in offices or homes as mentioned above, it has become necessary of course for toners to use safe materials and also for manufacturers to pay attention to odors therefrom that are generated in the course of fixing.

For example, with wide application of the recording processes such as electrophotography and wide use thereof in offices or homes as mentioned above, it has become necessary, of course, for developers to use safe materials and besides for manufacturers to take care of odors generated in the course of fixing. In most instances, deodorizing filters for adsorbing odors zone are attached to copying machines, printers and so forth. This is not only disadvantageous for production cost, but also troublesome for the maintenance of deodorizing power because of periodical replacement of filters.

With regard to this problem of odors, this is of course an important problem when the viewpoint of users or manufacturers is taken into consideration. In general, it is by no means easy from the technical side to solve this problem, when viewed from a fixing method in which a toner containing a synthetic resin as a main component is fixed on a transfer medium such as paper by utilizing the action of softening and melting by heat. It is not advisable to lower, for example, development performances such as image quality and durability of toner in order to solve this problem.

Various methods have been proposed so that these performances can be satisfied at the same time. However, a method in which an additive is used may often cause unexpected problems.

For this reason, it is preferred to improve the binder resin itself. For the purpose of such an improvement, it is considered better to decrease the amount of a residual solvent or residual polymerizable monomers that produce odors. Various methods have been hitherto proposed with concurrent attention to the influence on other development performances.

For example, Japanese Patent Application Laid-Open No. 55-155632 proposes that a polymer in which the content of a solvent used for obtaining the polymer or that of polymerizable monomers is less than 0.1% by weight is used as a binder resin for a toner so that the offset resistance, storage stability and fluidity of the toner can be improved.

Japanese Patent Application Laid-Open No. 53-17737 also discloses that residual polymerizable monomers have influence on the triboelectricity, blocking resistance and fixing properties of a toner, and proposes to decrease a residual solvent or residual polymerizable monomers of the solvent or monomers used for obtaining a polymer as a binder resin to be used for a toner.

Japanese Patent Application Laid-Open No. 64-70765 also proposes a resin for a toner containing 200 ppm or less of residual monomers, in order to cope with the problems that a work environment becomes unsatisfactory because of the odors generated when toner materials are melted and kneaded or that odors are generated at the time of copying to give an unpleasant environment. This publication also discloses that an amount more than 200 ppm of residual monomers may result in a lowering of blocking resistance and resistance to a vinyl chloride plasticizer, leaving the problem of odors.

When, however, the problem is particularly focused on the odors, it can not be said to be sufficient to only decrease the amount of residual polymerizable monomers, when taking into account of the possibility of wider application in the future, of the image forming method such as electrophotography and the electrostatic recording method.

In general, methods of polymerizing binder resins for toners are known to include solution polymerization, bulk polymerization and suspension polymerization.

In particular, as disclosed in Japanese Patent Application Laid-Open No. 63-223014, suspension polymerization requires no removal of solvent and also requires no strong stirring, and hence enables easy production of a resin. It also makes it possible for a resin to contain in any desired amount a THF-insoluble component that has great influence on the fixing properties and offset resistance of a toner. Thus, this is a preferable method.

In suspension polymerization, however, the resin is obtained in the form of beads. Hence, there is no step of removing a solvent or polymerizable monomers that remain in solution polymerization in which a resin is in a molten state, and instead merely has a drying step carried out for the purpose of removing water content. As a result, solvents or polymerizable monomers tend to remain in a large quantity, and therefore it is necessary to pay particular attention to the problem of odors as discussed above.

SUMMARY OF THE INVENTION

An object of the present invention is to provide a toner for developing an electrostatic image, that has solved the above problems, and a resin suited as a binder resin for such a toner, and also to provide a process for producing these toner and resin.

Another object of the present invention is to provide a toner for developing an electrostatic image, that has achieved an improvement in reducing odors.

Still another object of the present invention is to provide a toner for developing an electrostatic image, which contains a binder resin polymerized in an aqueous medium, and improved in odor.

A further object of the present invention is to provide a toner that can be free of odors and also simultaneously satisfy superior performances with respect to other properties.

A still further object of the present invention is to provide a binder resin for a toner improved in relation to odors.

A still further object of the present invention is to provide a binder resin for a toner polymerized in an aqueous medium, and improved in odors.

A still further object of the present invention is to provide a binder resin for a toner that can simultaneously provide superior performances in various points.

To achieve the above objects of the present invention, the present invention provides a toner for developing an electrostatic image, comprising a binder resin and a coloring agent, said binder resin comprising a styrene type binder resin; wherein an aldehyde is contained in said toner in an amount of not more than 0.005% by weight based on the weight of the toner.

The present invention also provides a process for producing a toner, comprising the steps of melt-kneading a mixture containing at least a coloring agent and a styrene type binder resin containing an aldehyde in an amount of not more than 0.01% by weight, cooling the melt-kneaded product to obtain a cooled product, and pulverizing the cooled product;

said toner containing the aldehyde in an amount of not more than 0.005% by weight.

The present invention additionally provides a binder resin comprising a styrene polymer, a styrene copolymer, a mixture of a styrene polymer and a styrene copolymer or a mixture of styrene copolymers, containing not less than 50% by weight of a styrene unit; wherein an aldehyde is contained in an amount of not more than 0.01% by weight based on the weight of said binder resin.

The present invention further provides a process for producing a binder resin, comprising the steps of:

preparing a monomer composition comprising a polymerizable monomer containing at least not less than 50% by weight of a styrene monomer, and a polymerization initiator, and subjecting said monomer composition to suspension polymerization in an aqueous medium having dissolved oxygen in an amount of not more than 2.5 mg/lit to form a styrene polymer or copolymer containing an aldehyde monomer in an amount of not more than 0.01% by weight.

The present invention still further provides an apparatus unit comprising an electrostatically chargeable member for supporting thereon an electrostatic image, a means for electrostatically charging the chargeable member, and a developing means for developing an electrostatic image supported on said chargeable member; wherein said developing means has a toner for developing an electrostatic image, comprising a styrene type binder resin and a coloring agent; wherein an aldehyde is contained in said toner in an amount of not more than 0.005% by weight based on the weight of the toner, and said charging means and developing means are integrally held together with said chargeable member to form a unit so that a single unit capable of being freely mounted on and detached from an apparatus main body is formed.

The present invention still further provides a facsimile apparatus comprising an electrophotographic apparatus and a means for receiving image information from a remote terminal; wherein said electrophotographic apparatus comprising an electrostatically chargeable member for supporting an electrostatic image, a means for electrostatically charging the chargeable member, and a developing means for developing an electrostatic image supported on said chargeable member; wherein said developing means has a toner for developing an electrostatic image, comprising a styrene type binder resin and a coloring agent; wherein an aldehyde is contained in said toner in an amount of not more than 0.005% by weight based on the weight of the toner.

DESCRIPTION OF THE PREFERRED EMBODIMENTS

Figure 1:
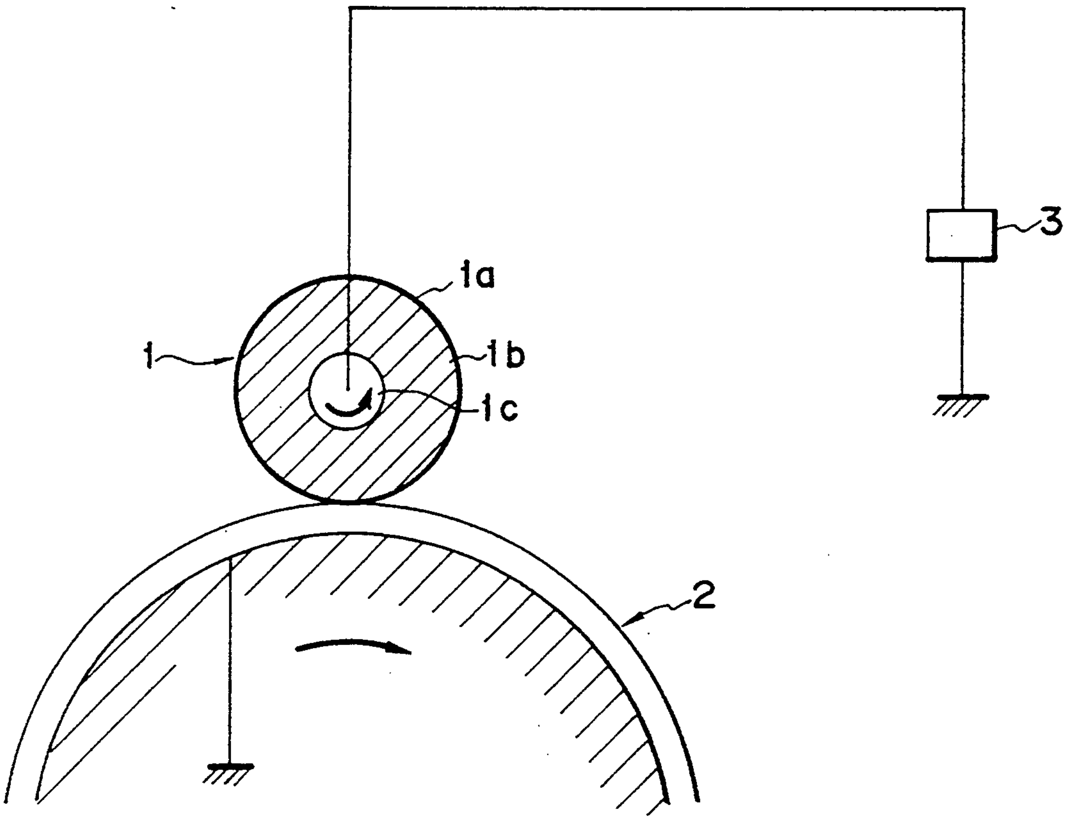
FIG. 1 schematically illustrates a charging roller used in an electrophotographic apparatus.

The present inventors made intensive studies on the factors of a binder resin for a toner that have an influence on the odors of a toner. As a result, they were convinced as follows: Although the amount of the solvent or polymerizable monomers remaining in a binder resin has an influence, the amount of oxidized products thereof, in particular, residual aldehydes produced as result of air oxidation of polymerizable monomers, has a greater influence than the former has. Hence, it is a good way for solving the problem of preventing the odors of a toner to decrease the amount of aldehydes that remain in a binder resin.

In particular, in a styrene type binder resin such as a styrene polymer or copolymer most commonly used as a binder resin, the benzaldehyde produced as a result of air oxidation of styrene monomers was revealed to be a component that causes most of the problem of odors. Thus, it was found that a great care must be taken in reducing the amount of residual aldehydes.

According to the studies made by the present inventors, the content of such aldehydes in a binder resin must be not more than 0.01% by weight, and particularly preferably not more than 0.005% by weight. If the content of the aldehydes is more than 0.01% by weight, a toner often effuses a strong odor.

According to further studies made by the present inventors, the content of aldehydes in a toner must be not more than 0.005% by weight, and particularly preferably not more than 0.004% by weight. If the content of the aldehydes is more than 0.005% by weight, an odor is often strongly perceived.

The binder resin of the present invention may preferably include a styrene type binder resin containing a component insoluble to tetrahydrofuran (THF), which will be described later.

In the present invention, the binder resin may also preferably be a styrene resin produced by suspension polymerization, containing an aldehyde in an amount of not more than 0.01% by weight.

As a result of intensive studies made by the present inventors on account of such problems in order to decrease aldehydes, it was found that what is desired can be achieved when the method as will be detailed below is employed.

The dissolved oxygen in the water that is a dispersion medium used in suspension polymerization is controlled to be not more than 2.5 mg/lit., and preferably not more than 2.0 mg/lit., when measured at a temperature of from 40° to 45° C. This enables suppression of air oxidation of polymerizable monomer such as styrene monomers, and consequently enables suppression of formation of aldehydes such as benzaldehyde.

It is conventionally known in suspension polymerization that an atmosphere of a polymerization system is replaced with nitrogen gas so that wasteful consumption of a polymerization initiator can be saved. However, what is thereby desired is to prevent the yield of polymerized product from being lowered, and is unsatisfactory for the purpose of decreasing the rate of formation of aldehydes. It was found that in order to decrease the rate of formation of aldehydes the dissolved oxygen in the water used in suspension polymerization must be decreased to a certain concentration.

The mechanism thereof is presumed as follows: Since in the suspension polymerization the polymerization takes place in the liquid droplets of polymerizable monomers suspended in the water, it is presumed that the liquid droplets of polymerizable monomers come into direct contact with the water in the site of this polymerization reaction and are strongly affected by the dissolved oxygen in the aqueous phase. Various known techniques can be used as a specific method of decreasing such dissolved oxygen. It is preferred to use a method in which a nitrogen-feed pipe is fitted in the water or aqueous phase so that nitrogen flows through water and thereby the dissolved oxygen can be decreased with good efficiency.

As a result, when the dissolved oxygen is in a concentration of not more than 2.5 mg/lit within the temperature range of from 40° to 45° C., the amount aldehydes in the binder resin becomes not more than 0.01% by weight. In a preferred instance, the aldehydes not more than 0.005% by weight when the dissolved oxygen is in a concentration of not more than 2.0 mg/lit. In addition, the wasteful consumption of the polymerization initiator can be decreased and at the same time it becomes possible to reduce the concentration of residual polymerizable monomers.

It is advisable to carry out in combination a method in which the suspension of a polymer thus obtained is heated at temperatures higher than about 70° C. so that the residual monomers are evaporated simultaneously with the evaporation of water.

The concentration of dissolved oxygen in water can be measured in the following way: Using a DO meter YSI, manufactured by Nikkaki Co., an electrode is put in air or water containing oxygen in a known amount, and an $O_2$ calibration selector is turned to adjust an indicated value to the oxygen concentration of a sample. Next, an electrode is put therein in the state that water having a temperature of from 40° to 45° C. is circulated in a flow velocity of about 30 cm/sec., and thus the dissolved oxygen is measured. In the case when the water is at a standstill, the electrode is manually moved and thus the dissolved oxygen is measured. The value is read when the indicated value has become stable.

The determination of aldehydes in a binder resin or a toner is carried out by gas chromatography in the following way.

Using 2.55 mg of dimethylformamide (DMF) as an internal standard, 100 ml of acetone is added to make up a solvent containing an internal standard material. Next, 200 mg of a binder resin or 200 mg of a toner is dissolved or dispersed in the above solvent to give a solution or dispersion. The resulting solution or dispersion is set on an ultrasonic shaking apparatus for 30 minutes, and thereafter left standing for 1 hour. Next, filtration is carried out using a 0.5 μm filter. In the gas chromatography, the sample is shot in an amount of 4 l μl.

The gas chromatography is carried out under conditions as follows:

Capillary column (30 m×0.249 mm, DBWAX, film thickness: 0.25 μm)

Detector: FID (flame ionization detector); nitrogen pressure: 0.35 kg $cm^2$

Injection temperature: 200° C.; detector temperature: 200° C., Column temperature: raised for 30 minutes from 50° C. at a rate of 5° C/min.

Preparation of calibration curve

An aldehyde to be measured is added to a solution DMF and acetone prepared in the same amount of a sample solution. A standard sample thus obtained is similarly subjected to measurement by gas chromatography to determine a value for weight ratio/area ratio between the aldehyde and the internal standard material DMF.

In the suspension polymerization, the dissolved oxygen in the aqueous phase is controlled to be 2.5 mg/lit. The binder resin as intended in the present invention can be thereby obtained. In order to highly satisfy grindability, offset resistance, fixing properties, filming or melt-adhesion resistance to a photosensitive member, image properties, etc., the binder resin may preferably contain from 10 to 70% by weight, preferably from 10 to 60% by weight, a tetrahydrofuran(THF)-insoluble matter, as proposes in Japanese Patent Application Laid-Open No. 63-223014. The binder resin may be more preferable, which i) having a weight average molecular weight number average molecular weight (Mw/Mn) of ≧5, at least one peak at the region of a molecular weight of from 2,000 to 10,000 and at least one peak or shoulder at the region of a molecular weight of from 15,000 to 100,000, in the molecular weight distribution measured by gel permeation chromatography (GPC) of a THF-soluble matter in the binder resin, and ii) containing a component with a molecular weight of not more than 10,000 in an amount of from 10 to 50% by weight based on the THF-soluble resin composition.

The THF-insoluble matter referred to in the present invention indicates the weight proportion of a polymer component that has become insoluble to THF (i.e., substantially a cross-linked polymer) in a resin or resin composition. This can be used as a parameter that indicates the degree of cross-linking of the resin composition containing a cross-linked component. The THF-insoluble matter in the binder resin is defined by a value measured in the following way.

A sample (a 24 mesh-pass and 60 mesh-on powder) of the resin or resin composition is weighed in an amount of from 0.5 to 1.0 g ($W_1$ g), which is then put in a cylindrical filter paper (for example, No. 86R, available from Toyo Roshi K.K.) and set on a Soxhlet extractor. Extraction is carried out for 6 hours using from 100 to 200 ml of THE as a solvent, and the soluble component extracted by the use of the solvent is evaporated, followed by vacuum drying at 100° C. for several hours. Then the THF-soluble resin component is weighed ($W_2$ g). The THF-insoluble matter of the resin or resin composition is determined from the following expression.

$$\text{THF-insoluble matter (\%)} = [(W_1 - W_2)/W_1] \times 100$$

The THF-insoluble matter in the toner is defined by a value measured in the following way.

In the case when the toner is a non-magnetic toner, the content of a dye or pigment is previously measured by a known method. In the case when the toner is a magnetic toner, the content of a dye or pigment and that of a magnetic material are previously measured by a known method. Next, a given amount of from 0.5 to 1.0 g of the toner is weighed ($W_1$ g), which is then put in a cylindrical filter paper (for example, No. 86R, available from Toyo Roshi K.K.) and set on a Soxhlet extractor. Extraction is carried out for 6 hours using from 100 to 200 ml of chloroform as a solvent, and the soluble component extracted by the use of the solvent is evaporated, followed by vacuum drying at 100° C. for several hours. Then the THF-soluble resin component is weighed ($W_2$ g). Then, among coloring agents such as dyes or pigments and magnetic materials contained in a given amount of the toner, the weight of the components soluble in THF is represented by $W_3$ g, and the weight of the components insoluble THF, by $W_4$ g. The THF-insoluble matter of the resin component in the toner is calculated from the following expression.

$$\text{Content of THF-insoluble matter (\%)} = (W_1 - W_2 - W_4)/(W_1 - W_3 - W_4) \times 100$$

In the present invention, the molecular weight at the peak and/or shoulder on the chromatogram obtained by GPC (gel permeation chromatography) is/are measured under the following conditions.

Columns are stabilized in a heat chamber heated to 40° C. To the columns kept at this temperature, THF (tetrahydrofuran)as a solvent is flowed at a flow rate of 1 ml per minute, and from 50 to 200 μl of a THF sample solution of a resin prepared to have a sample concentration of from 0.05 to 0.6% by weight is injected thereinto to make measurement. In measuring the molecular weight of the sample, the molecular weight distribution ascribed to the sample is calculated from the relationship between the logarithmic value and count number of a calibration curve prepared using several kinds of monodisperse polystyrene standard samples. As the standard polystyrene samples used for the preparation of the calibration curve, it is preferred to use, for example, samples with molecular weights of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$ and $4.48\times10^6$, which are available from Pressure Chemical Co. or Toyo Soda Manufacturing Co., Ltd. It is suitable to use at least about 10 standard polystyrene samples. An RI (refractive index) detector is used as a detector.

Columns may preferably be used in combination of a plurality of commercially available polystyrene gel columns so that the regions of molecular weights of from $10^3$ to $2\times10^6$ can be accurately measured. For example, they may preferably comprise a combination of μ-Styragel 500, $10^3$ and $10^4$, available from Waters Co.; Shodex KF-80M or a combination of KF-801, 803, 804 and 805 or a combination of KA-802, 803, 804 and 805, available from Showa Denks K.K.; or a combination of TSKgel G1000H, G2000H, G2500H, G3000H, G4000H, G5000H, G6000H, G7000H and GMH, available from Toyo Soda Manufacturing Co., Ltd.

In regard to the % by weight with respect to the binder resin of the present invention, having a molecular weight of not more than 10,000, a chromatogram obtained by GPC is cut out at the part corresponding to the molecular weight of not more than 10,000, and the weight ratio thereof to a cutting responding to a molecular weight of more than 10,000 is calculated. Using the % by weight or the above THE-insoluble matter, the % by weight with respect to the whole binder resin is calculated.

A styrene type binder resin is used as the binder resin of the present invention.

The styrene type binder resin includes, for example, styrene polymers, styrene copolymers, resin compositions comprising styrene polymers and styrene copolymers, and resin compositions comprising styrene copolymers and different types of styrene copolymers.

The resin or resin composition in the toner the present invention includes those obtained by polymerizing styrene with one or more kinds of monomers selected from styrenes, acrylic acids, methacrylic acids and derivatives thereof. These are preferable in view of development properties and triboelectric properties. As the examples of monomers that can be used, the styrenes include α-methylstyrene, vinyl toluene, and chlorostyrene. The acrylic acids, methacrylic acids and derivatives thereof include acrylic acid, methyl acrylate, ethyl acrylate, propyl acrylate, butyl acrylate, octyi acrylate, 2-ethylhexyl acrylate, n-tetradecyl acrylate, n-hexadecyl acrylate, lauryl acrylate, cyclohexyl acrylate, diethylaminoethyl acrylate, dimethylaminoethyl acrylate, methacrylic acid, metnyi methacrylate, ethyl methacrylate, prepyl methacrylate, butyl methacrylate, amyl methacrylate, hexyl methacrylate, 2-ethylhexyl methacrylate, octyl methacrylate, decyl methacrylate, dodecyl methacrylate, lauryl methacrylate, cyclohexyl methacrylate, phenyl methacrylate, 2-hydroxyethyl methacrylate, 2-hydroxypropyl methacrylate, dimethylaminoethyl methacrylate, glycidyl methacrylate, and stearyl methacrylate. Besides the above monomers, other monomers may be used in a small amount so long as the objects of the present invention can be achieved, which include, for example, acrylonitrile, 2-vinylpyridine, 4-vinylpyridine, vinylcarbazole, vinyl methyl ether, butadiene, isoprene, maleic anhydride, maleic acid, maleic acid monoesters, maleic acid diesters, and vinyl acetate.

One or more kinds of these vinyl monomers are used in combination of the styrene monomer. Of these, preferred is a styrene copolymer which is formed using styrene and an acrylate or methacrylate as main components.

It is an important factor for obtaining the resin intended in the present invention to select the kinds of a polymerization initiator, a solvent and a solution or dispersion medium and the conditions for reaction.

The polymerization initiator includes, for example, organic peroxides such as benzoyl peroxide, 1,1-di(t-butylperoxy)-3,3,5-trimethylcyclohexane, n-butyl-4,4-di(t-butylperoxy)valerate, dicumyl peroxide, α,α'-bis(t-butylperoxydiisopropyl)benzene, t-butylperoxycumene, and di-t-butyl peroxide; and azo or diazo compounds such as azobisisobutylonitrile and diazoaminoazobenzene.

The binder resin of the present invention may also be cross-linked in part or in its entirety, using a cross-linkable monomer.

A compound mainly having two or more polymerizable double bonds is used as the cross-linkable monomer.

For example, a bifunctional cross-linking agent can be used, which includes, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, respectively, dipropylene glycol diacrylate, polypropylene glycol diacrylate, and polyester type diacrylate (MANDA, available from Nippon Kayaku Co., Ltd.) It also include those in which the acrylate units of the above acrylate type cross-linking agents have been respectively replaced by methacrylate units.

A polyfunctional cross-linking agent can also be used, which includes pentaerythritol triacrylate, trimethylolethane triacrylate, trimethylolpropane triacrylate, tetramethylolmethane tetraacrylate, oligoester acrylate and methacrylate thereof, 2,2-bis(4-methacryloxy, polyethoxyphenyl)propane, diallyl phthalate, triallyl cyanurate, triallyl isocyanurate, triallyl isocyanurate, and diaryl chlorendate. Among these, divinylbenzene is effective.

The components for the binder resin of the present invention may preferably be synthesized by suspension polymerization in order to control the THF-insoluble matter. For the purpose of controlling molecular weight distribution, a method of synthesizing basically two or more kinds of polymers is preferred.

The method is exemplified by a method in which a first polymer or copolymer soluble in THF and also soluble in a polymerizable monomer is dissolved in polymerizable monomers containing cross-linkable monomers and then the monomers are polymerized to give a resin composition containing cross-linked resin components. In this instance, the first polymer or copolymer and the cross-linked latter (second) polymer or copolymer are uniformly mixed, so that when the product is applied in a toner it becomes possible to improve fixing properties and offset resistance without damage of the durability and blocking resistance of the toner.

The first polymer or copolymer soluble in THF may preferably be obtained by solution polymerization or ionic polymerization. The second polymer or copolymer for producing a component insoluble to THF may preferably be synthesized by suspension polymerization or bulk polymerization in the presence of a cross-linkable monomer under conditions where the first polymer or copolymer is dissolved therein. The first polymer or copolymer may preferably be used in an amount of from 10 to 120 parts by weight, and preferably from 20 to 100 parts by weight, based on 100 parts by weight of polymerizable monomers used for the formation of the second polymer or copolymer.

For example, in the process for producing the binder resin of the present invention, it is preferred that a first resin is prepared by solution polymerization, the first resin thus prepared is dissolved in polymerizable monomers, and the polymerizable monomers are subjected to suspension polymerization in the presence of the resin and a cross-linking agent. The first resin should be dissolved in an amount of 10 to 120 parts by weight, preferably from 20 to 100 parts by weight, based on 100 parts by weight of the monomers for the suspension polymerization. In carrying out the suspension polymerization, the cross-linking agent may preferably be used in an amount of from about 0.1 to about 2.0% by weight based on the monomers used for the suspension polymerization. These conditions may be more or less varied depending on the kind of the initiator and reaction temperatures.

There is a finding that a toner has a difference in performance between the instance where the first polymer or copolymer is dissolved in monomers and the binder resin is obtained by suspension polymerization and the instance where a resin obtained by suspension polymerization without dissolving the first polymer or copolymer and the first polymer or copolymer are merely mixed. The former brings about better results particularly in respect of fixing properties.

The solution polymerization and suspension polymerization according to the present invention will be described below.

The solvent used in these in the solution polymerization includes xylene, toluene, cumene, cellosolve acetate, isopropyl alcohol, and benzene. In the case of styrene monomers, xylene, toluene or cumene is preferred. These may be appropriately selected depending on the polymer to be produced by polymerization. The polymerization initiator includes di-tert-butyl peroxide, tert-butylperoxybenzoate, benzoyl peroxide, 2,2'-azobisisobutyronitrile, and 2,2'-azobis(2,4-dimethylvaleronitrile), which may be used in a concentration of not less than 0.1 part by weight, and preferably from 0.4 to 15 parts by weight, based on 100 parts by weight of monomers. Reaction temperature may vary depending on the solvent used, the initiator and the polymer obtained by polymerization. Preferably, the reaction may be carried out at 70° C. to 180° C. The solution polymerization may preferably be carried out using from 30 parts by weight to 400 parts by weight of monomers based on 100 parts by weight of the solvent. It is also possible to use a method of obtaining the product by thermal polymerization.

The suspension polymerization may preferably be carried out using not more than 100 parts by weight, and preferably from 10 to 90 parts by weight, of monomers based on 100 parts by weight of an aqueous medium. A dispersant that can be used includes polyvinyl alcohol, partially saponified polyvinyl alcohol, and calcium phosphate. Its appropriate amount depends on the amount of monomers based on the aqueous medium. It is commonly used in an amount 0.05 to 1 part by weight based on 100 parts by weight of the aqueous medium. Polymerization temperature may suitably be in the range of from 50° to 95° C., and should be appropriately selected depending on the polymerization initiator used and the polymer to be obtained. The polymerization initiator may be of any kinds, which can be used so long as they are insoluble or sparingly soluble in water. For example, benzoyl peroxide, tert-butylperoxyhexanoate or the like can be used in an amount of from 0.5 to 10 parts by weight based on 100 parts by weight of monomers.

In addition to the above binder resin components, the toner in which the resin of the present invention is employed may also contain the following materials in a proportion smaller than the content of the binder resin components, for example, in an amount of not more than 50% by weight, and more preferably not more than 20% by weight, so long as the effect of the present invention is not adversely affected.

Such materials include, for example, silicone resins, polyesters, polyurethanes, polyamides, epoxy resins, polyvinyl butyral, rosins, modified rosins, terpene resins, phenol resins, hydrocarbon resins such as low-molecular polyethylene and low-molecular polypropylene, aromatic petroleum resins, chlorinated paraffins, and paraffin waxes.

Commonly known dyes and pigments can be used as the coloring agent contained in the toner according to the present invention. Such dyes and pigments include carbon black, nigrosine dyes, lamp black, Sudan Black SM, First Yellow G, Benzidine Yellow, Pigment Yellow, Indofirst Orange, Irgazine Red, Paranitroaniline Red, Toluidine Red, Carmine 6B, Permanent Bordeaux F3R, Pigment Orange R, Lithol Red 2G, Lake Red C, Rhodamine FB, Rhodamine B Lake, Methyl Violet B Lake, Phthalocyanine Blue, Pigment Blue, Brilliant Green B, Phthalocyanine Green, Oil Yellow GG, Zapon First Yellow CGG, Kayaset Y963, Kayaset YG, Sumiplast Yellow GG, Zapon First Orange RR, Oil Scarlet, Sumiplast Orange G, Orazole Brown B, Zapon First Scarlet CG, Aizenspiron Red BEH, and Oil Pink OP. In general, these coloring agents may preferably be added in an amount of from 5 to 20% by weight based on the binder resin.

In instances in which the toner according to the present invention is used as a magnetic toner, magnetic toner particles to be contained include particles of metals composed of a ferromagnetic element such as iron, cobalt and nickel, or alloys comprising any of these metals, compounds such as ferrite and magnetite, and alloys which do not comprise any ferromagnetic element but may exhibit ferromagnetic properties as a result of suitable heat treatment (as exemplified by an alloy of the type called Heusler's alloy containing manganese and copper, such as manganese-copper-aluminum or manganese-copper-tin, or chromium dioxide and others). Fine powder of these magnetic materials may preferably be contained in an amount of 30 to 150 parts by weight, and more preferably from 40 to 100 parts by weight, based on 100 parts by weight of the binder resin. It is also possible to use magnetic fine particles as a black or brown pigment.

A charge controlling agent contained in the toner according to the present invention may be selected from conventionally known charge controlling agents. Examples of a positive charge controlling agent are nigrosine, azine dyes containing an alkyl group having 2 to 16 carbon atoms (Japanese Patent Publication No. 42-1627), basic dyes as exemplified by C.I. Basic Yellow 2 (C.I.41000), C.I. Basic Yellow 3, C.I. Basic Red 1 (C.I.45160), C.I. Basic Red 9 (C.I.42500), C.I. Basic Violet 1 (C.I.42535), C.I. Basic Violet 3 (C.I.42555), C.I. Basic Violet 10 (C.I.45170), C.I. Basic Violet 14 (C.I.42510), C.I. Basic Blue 1 (C.I.42025), C.I. Basic Blue 3 (C.I.51005), C.I. Basic Blue 5 (C.I.42140), C.I. Basic Blue 7 (C.I.42595), C.I. Basic Blue 9 (C.I.52015), C.I. Basic Blue 24 (C.I.52030), C.I. Basic Blue 25 (C.I.52025), C.I. Basic Blue 26 (C.I.44025), C.I. Basic Green 1 (C.I.42040), and C.I. Basic Green 4 C.I.42000). Lake pigments of these basic dyes (laking agents are exemplifeied by tungstophosphoric acid, molybdophosphoric acid, tungstomolybdophosphoris acid, tannic acid, lauric acid, gallic acid, ferricyanides, and ferrocyanides) include C.I. Solvent black 3 (C.I.26150), Hanza Yellow G (C.I.11680), C.I. Mordant Black 11, and C.I. Pigment Black 1.

They also include, for example, quarternary ammonium salts such as benzoylmethyl-hexadecylammonium chloride and decyl-trimethylammonium chloride, or polyamide resins such as vinyl polymers containing an amino group and condensed polymers containing an amino group. They preferably include nigrosine, quarternary ammonium salts, triphenylmethane nitrogen-containing compounds, and polyamides.

Examples of a negative charge controlling agent are metal complexes of monoazo dyes, as disclosed in Japanese Patent Publications No. 41-20153, No. 42-27596, No. 44-6397 and No. 45-26478, nitramines and salts thereof, as disclosed in Japanese Patent Application Laid-Open No. 50-133338 or dyes or pigments such as C.I.14645, metal complex salts formed by the union of Zn, Al, Co, Cr or Fe with salicylic acid, naphthoic acid or dicarboxylic acid, as disclosed in Japanese Patent Publications No. 55-42752, No. 58-41508, No. 59-7384 and No. 59-7385, sulfonated copper phthalocyanine pigments, styrene oligomers into which a nitro group or halogen has been introduced, and chlorinated paraffins. Particularly from the viewpoint of their dispersibility to a resin, preferred are metal complexes of monoazo dyes, and metal complex salts of salicylic acid, alkylsalicylic acid, naphthoic acid or dicarboxylic acid. These charge controlling agents may preferably be added in an amount of from 0.1 to 3 parts by weight based on 100 parts by weight of the binder resin. The ill effects such that the developing power and environmental stability may be lowered because of the contamination of the surface of a developing sleeve, caused by the above charge controlling agents, can be thereby suppressed to minimums while keeping the good triboelectric chargeability as described above.

In the toner of the present invention, an ethylenic olefin polymer may be used as a fixing aid together with the binder resin.

Here, the polymer used as an ethylenic olefin homopolymer or ethylenic olefin copolymer includes polyethylene, polypropylene, an ethylene/propylene copolymer, an ethylene/vinyl acetate copolymer, an ethylene/ethyl acrylate copolymer, and ionomers having a polyethylene skeleton. The above ethylenic olefin copolymer may preferably contain olefin monomers in an amount of not less than 50 mol %, and more preferably not less than 60 mol %.

The toner of the present invention can be usually be produced in the following way.

(1) The binder resin and the coloring agents such as magnetic materials and dye or pigments are uniformly dispersed using a mixing machine such as a Henschel mixer.

(2) The dispersant thus obtained is melt-kneaded at a temperature of from 90° to 180° C. using a melt kneader such as a kneader, an extruder and a roll mill.

(3) The resulting kneaded product is cooled, and then the cooled kneaded product is crushed with a crusher such as a cutter mill and a hammer mill. Thereafter, the crushed product is finely pulverized using a fine grinder such as a jet mill.

(4) The finely pulverized product is classified give toner, using a classifier such as a zig-zag classifier and or an elbow-jet classifier.

Electrophotography in which the toner employing the resin binder of the present invention is applied will be described below.

A process in which an electrostatic latent image is formed into a visible image by the use of a toner includes the magnetic brush development, the cascade development, the powder cloud development, the method disclosed in U.S. Pat. No. 3,909,258 in which a conductive magnetic toner is used, which are as previously referred to, and a method in which a magnetic toner with a high resistivity is used, as disclosed in Japanese Patent Application Laid-Open No. 53-31136. The toner in which the binder resin according to the present invention is used is also suitable for a development process in which a one-component developer comprising a magnetic toner containing magnetic particles is used. In the step of transferring a developed toner image to a transfer medium, electrostatic transfer methods are used, as exemplified by the corona transfer method and a method in which a bias is applied to a contact transfer member.

In recent years, a method in which a bias is applied through a member coming into direct contact with a photosensitive member has attracted notices since the methods for electrostatic charging and/or transfer and/or residual charge elimination that utilize corona discharging on a photosensitive member from a member not coming into contact with the photosensitive member are accompanied with generation of ozone. Following the shift to such a new method, the activated carbon filters often attached to conventional copying machines or printers are removed in some instances. In such instances, the toner the present invention can be remarkably effective.

In the toner in which the binder resin of the present invention, the blade cleaning method, the fur brush cleaning method or the like may be applied in the step of removing the toner remaining on a photosensitive layer or an insulating layer. In particular, the toner is suited for the blade cleaning method.

As a method by which a toner image formed on the transfer medium is fixed on the medium, the heat fixing method, the solvent fixing method, the brush fixing method, the laminate fixing method, etc. can be used. The present invention is particularly suited for the heat-roller fixing method.

An image forming process and an image forming apparatus in both of which the toner of the present invention can be preferably used will be further described with reference to FIGS. 1 and 2.

Figure 2:
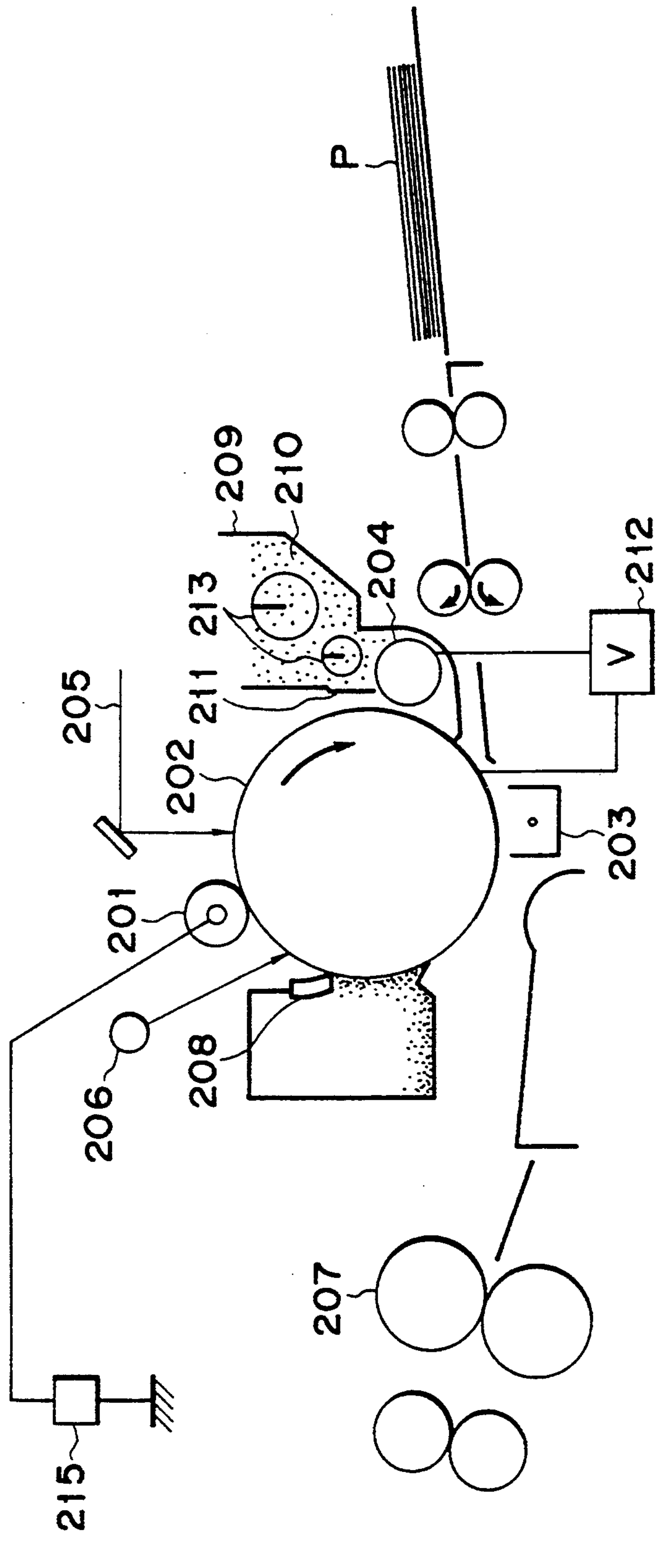
FIG. 2 schematically illustrates an example of the electrophotographic apparatus.

FIG. 1 schematically illustrates the constitution of a contact charging assembly used in Examples described later. The numeral 2 denotes a photosensitive drum serving as a chargeable member, which is comprised of a drum substrate made of aluminum and formed on the periphery thereof an organic photoconductor (OPC) serving as a photosensitive layer, and is rotated at a given speed in the direction of an arrow. The photosensitive drum 2 is 30 mm in outer diameter. The numeral 1 denotes a charging roller which is a charging member brought into contact with the photosensitive drum 2 at a given pressure, and is comprised of a metallic core 1*c*, a conductive rubber layer 1*b* provided thereon, and further provided thereon a surface layer 1*a*, a release film. The conductive rubber layer may preferably have a thickness of from 0.5 to 10 mm, and preferably from 1 to 5 mm. The surface layer comprises a release film. It is preferred to provide the release film so that the toner according to the present invention may match the image forming process. Since, however, a release film with an excessively large resistivity may give no electrostatic charges on the photosensitive drum 2 and, on the other hand, a release film with an excessively small resistivity may cause an excessively large voltage applied to the photosensitive drum 2 to damage the drum or produce pinholes, the release should have an appropriate resistivity, preferably a volume resistivity of from $10^9$ to $10^{14}\Omega\cdot m$. Here, the release film may preferably have a thickness of not more than 30 $\mu m$, and more preferably from 10 to 30 $\mu m$.

The lower limit of the release film may be smaller so long as no peel or turn-up may occur, and can be considered to be abut 5 $\mu m$.

The charging roller 1 has an outer diameter of 12 mm. The conductive rubber layer 1*b*, having a layer thickness of about 3.5 mm, is composed of an ethylene-propylene-diene terpolymer (EPDM), and the surface layer 1*a* is formed of a nylon resin (specifically, methoxymethylated nylon) in a thickness of 10 $\mu m$. The charging roller 1 is made to have a hardness of 54.5° (ASKER-C). The numeral 3 denotes an electric source that applies a voltage to the charging roller 1, and feeds a given voltage to the metallic core 1*c* (diameter: 5 mm) of the charging roller 1. The electric source that applies a voltage to the charging roller 1 may preferably be the one capable of applying a DC voltage overlaid with an AC voltage.

In order to adjust the electrical resistivity, it is preferred to disperse conductive fine powder such as carbon in the conductive rubber layer and/or the release film.

Preferable process conditions used here are shown below.

Contact pressure: 5 to 500 g cm
AC voltage: 0.5 to 5 $KV_{pp}$.
AC frequency : 50 to 3,000 $H_z$.
DC voltage (absolute value): 200 to 900 V In the apparatus shown in FIG. 2, the surface of a photosensitive member 202 is negatively or positively charged by the operation of a contact charging assembly 201 having a voltage applying means 215, and a digital latent image is formed by image scanning through exposure 205 using a laser beam (or an analog latent image is formed by analog exposure). The latent image thus formed is reversely developed (or normally developed) using a negatively chargeable one-component magnetic toner 210 held in a developing assembly 209 equipped with a developing sleeve 204 in which a magnetic blade 211 and a magnet are provided. In the developing zone, an AC bias, a pulse bias and/or a DC bias is/are applied between a conductive substrate of the photosensitive drum 202 and the developing sleeve 204 through a bias applying means 212. A transfer paper P is fed and delivered to a transfer zone, where the transfer paper P is electrostatically charged from its back surface fine surface opposite to the photosensitive drum) through a transfer means 203, so that the developed image (toner image) on the surface of the photosensitive drum electrostatically transferred to the transfer paper P. The transfer paper P separated from the photosensitive drum 202 is subjected to fixing using a heat-pressure roller fixing unit (thermal platen) 207 so that the toner image on the transfer paper can be fixed.

The one-component toner remaining on the photosensitive drum 202 after the transfer step is removed by the operation of a cleaning assembly 208 having a cleaning blade. After the cleaning, the residul charge on the photosensitive drum 202 is eliminated by the erasing exposure 206, and thus the procedure starting from the charging step using the contact charging assembly 201 is repeated.

An electrostatic charge retainer (the photosensitive drum) comprises a photosensitive layer and a conductive substrate, and is rotated in the direction of an arrow. In the developing zone, the developing sleeve 204, a non-magnetic cylinder, which is a toner supporting member, is rotated so as to move in the same direction as the direction in which the electrostatic charge retainer is rotated. In the inside of the non-magnetic cylindrical sleeve 204, a multi-polar permanent magnet (magnet roll) serving as a magnetic field generating means is provided in an unrotatable state. The one-component insulating magnetic toner 210 held in the developing assembly 209 is coated on the surface of the non-magnetic cylindrical sleeve 204, and, for example, negative triboelectric charges are imparted to toner particles because of the friction between the surface of the sleeve 204 and the toner particles. A doctor blade 211 made of iron is disposed opposingly to one of the magnetic pole positions of the multi-polar permanent magnet, in proximity (with an interval of from 50 μm to 500 μm) to the surface of the cylinder. Thus, the thickness of a toner layer can be controlled to be thin (from 30 μm to 300 μm) and uniform so that a toner layer smaller in thickness than the gap between the photosensitive drum 202 and developing sleeve 204 in the developing zone can be formed in a non-contact state. The rotational speed of this developing sleeve 204 is regulated so that the peripheral speed of the sleeve can be substantially equal or close to the speed of the peripheral speed of the electrostatic charge receptor. As the magnetic doctor blade 211, a permanent magnet may be used in place of iron to form an opposing magnetic pole. In the developing zone, the AC bias or pulse bias may be applied through bias means 212, between the developing sleeve 204 and the surface on which electrostatic charges are retained. This AC bias may have a frequency of from 200 to 4,000 Hz, and a Vpp of from 500 to 3,000 V.

When the toner particles are moved in the developing zone, the toner particles are moved to the latent image side by the electrostatic force of the electrostatic charge retaining surface and the action of the AC bias or pulse bias.

In place of the magnetic doctor blade 211, an elastic blade made of an elastic material such as silicone rubber may be used so that the layer thickness of the toner layer can be controlled by pressure and thereby the toner can be coated on a toner supporting member.

The electrophotographic apparatus may be constituted of a combination of plural components integrally joined as one apparatus unit from among the constituents such as the above photosensitive member, developing means and cleaning means so that the unit can be freely mounted on or detached from the body of the apparatus. For example, at least one of the charging means, developing means and cleaning means may be integrally supported together with the photosensitive member to form one unit that can be freely mounted on or detached from the body of the apparatus, and the unit can be freely mounted or detached using a guide means such as a rail provided in the body of the apparatus. Here, the above apparatus unit may be so constituted as to be joined together with the charging means and/or the developing means.

Figure 3:
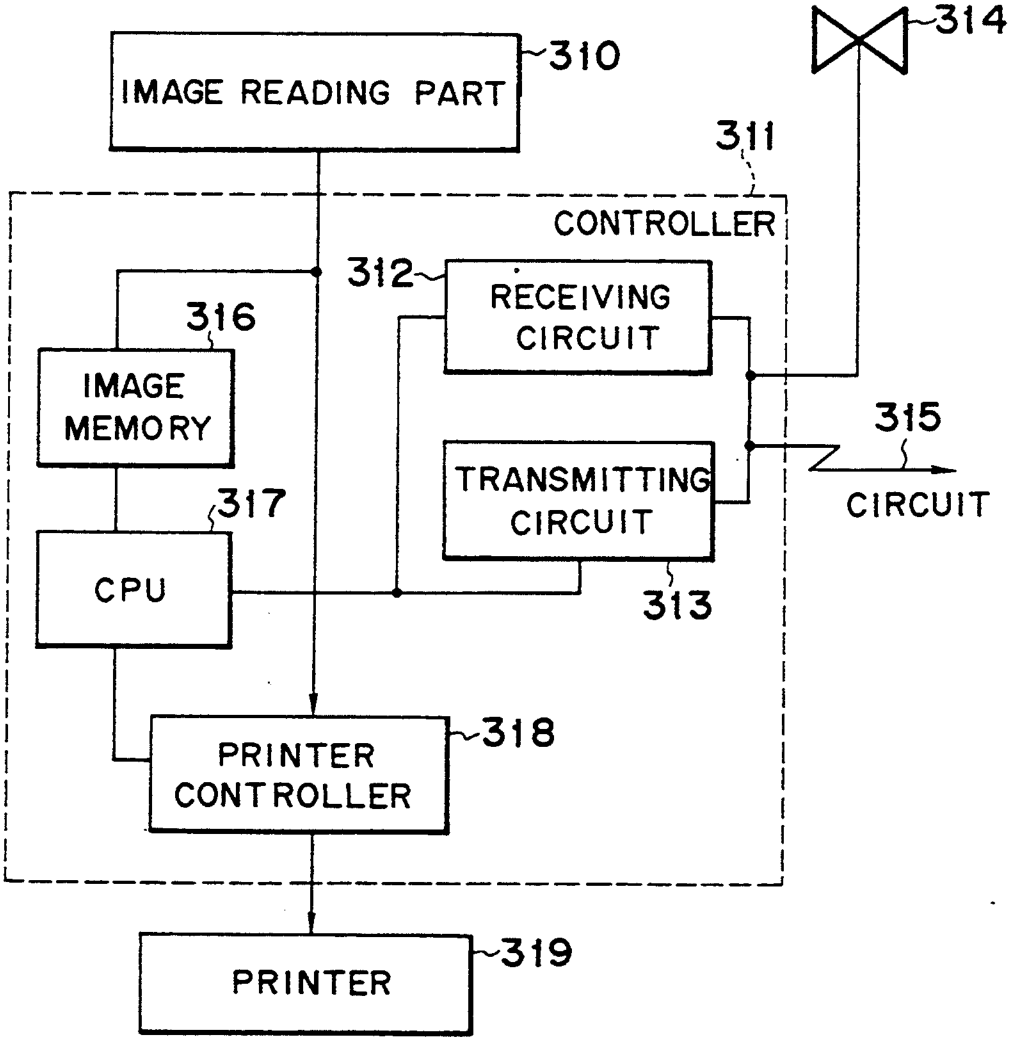
FIG. 3 is a block diagram showing an example of a facsimile apparatus.

In the case when the image forming apparatus having the toner of the present invention is used as a printer of a facsimile system, optical image exposing light 305 serves as exposing light used for the printing of received data. FIG. 3 illustrates an example thereof in the form of a block diagram.

A controller 311 controls an image reading part 310 and a printer 319. The whole of the controller 311 is controlled by CPU 317. Image data outputted from the image reading part is sent to the other facsimile station through a transmitting circuit 313. Data received from the other station is sent to a printer 319 through a receiving circuit 312. Given image data are stored in an image memory 316. A printer controller 318 controls the printer 319. The numeral 314 denotes a telephone.

An image received from a circuit 315 (image information from a remote terminal connected through the circuit) is demodulated in the receiving circuit 312 and then successively stored in an image memory 316 after the image information is decoded by the CPU 317. Then, when images for at least one page have been stored in the memory 316, the image recording for that page is carried out. The CPU 317 reads out the image information for one page from the memory 316 and sends the coded image information for one page to the printer controller 318. The printer controller 318, having received the image information for one page from the CPU 317, controls the printer 319 so that the image information for one page is recorded.

The CPU 317 receives image information for next page in the course of the recording by the printer 319. Images are thus received and recorded.

EXAMPLES

The present invention will be specifically described below by giving Examples. The "part (s)" and "%" used in Examples all refer to "parts by weight" and "% by weight".

EXAMPLE 1

(1-1) Preparation of binder resin

In a reaction vessel, 200 parts of cumene was introduced, and heated to its reflux temperature. A mixture of 100 parts of styrene monomers and 8 parts of di-tert-butyl peroxide was dropwise added thereto ever a period of 4 hours under the reflux of cumene. Also under the reflux of cumene (146° C. to 156° C.), polymerization was completed and then the cumene was removed. The resulting polystyrene was capable of dissolving in THF, and had a weight average molecular weight (Mw) of 3,700, a weight average molecular weight-;number average molecular weight (Mw, Mn) of 2.64, a main peak at a molecular weight of 3,500 as measured by GPC, and a Tg of 57° C.

The above polystyrene in an amount of 30 parts was dissolved in the following monomer mixture to give a mixed solution.

| Monomer mixture | Mixing proportion |
|---|---|
| Styrene monomer | 54 parts |
| n-Butyl acrylate monomer | 16 parts |
| Divinylbenzene | 0.3 part |
| Benzoyl peroxide | 1.3 parts |

In the above mixed solution, 170 parts water with a dissolved oxygen of about 1.5 mg/lit. in which 0.1 part of partially saponified polyvinyl alcohol was dissolved was added to give a suspension dispersion. In a reaction vessel, 15 parts of water was put, nitrogen was introduced from a nitrogen fees pipe, temperature was maintained at 40° to 45° C., and the nitrogen was flowed so as for the dissolved oxygen to be in a concentration of about 1.5 mg, lit. In this state, the above suspension dispersion was added in the reaction vessel, and suspension polymerization was carried out at reaction temperatures of from 70° to 95° C. for 9 hours. After completion of the reaction, reaction mixture was filtered, dehydrated and dried to give a resin composition A comprised of polystyrene and a styrene/n-butyl acrylate copolymer.

In the resulting resin composition A, a THF-insoluble matter and a THF-soluble matter were in a uniformly mixed state and the polystyrene and the styrene/n-butyl acrylate copolymer were also in a uniformly mixed state. The resin composition A thus obtained was formed into powder of 24 mesh-pass and 60 mesh-on. About 0.5 g thereof was weighed and put into a cylindrical filter paper No. 86R, manufactured by Toyo Roshi Co., of 28 mm in diameter and 100 mm in length. THF (200 ml) was refluxed at the rate of once in every about 4 minutes, and then the THF-insoluble matter was measured. The THF-insoluble matter in the resulting resin composition A was in an amount of 25% by weight. The molecular weight distribution of the THF-soluble matter was measured to reveal that it had peaks at molecular weights of 4,000 and 34,000, respectively, an Mn of 5,500, an Mw of 130,000, and an Mw/Mn of 24. The component with a molecular weight not more than 10,000 was in an amount of 25% by weight. It was also confirmed that the glass transition point (Tg) of the resin composition A was 58° C.

The content of benzaldehyde was not more than 0.003% by weight, and that of styrene monomers was 0.018% by weight.

The resulting resin composition A (10 g) was put in a sealed glass container of 200 cc, and then heated at 150° C. for 10 minutes. Thereafter, odors were evaluated with heating.

The resin composition slightly smelled, but was regarded as non-problem in practical use.

The above resin composition A was pulverized into powder of about 10 μ in average particle diameter, which was then put in a color cartridge for a copying machine FC-3, manufactured by Canon Inc., in place of its toner. Development biases, transfer electric currents and so forth were adjusted or modified so that a uniform resin particle layer can De formed on the surface of paper, and development on the photosensitive member and transfer to the paper were carried out. Thereafter, the paper thus processed was passed through a fixing unit (a platen assembly), and odors generated in that case were observed.

Evaluation on odors was made in the following way: The above copying machine was placed at the center of a small room of about 3 m square. Copies were continuously taken according to the above procedure of fixing the resin particles on paper. On its surroundings, 10 panelists chosen at random smelled while they were changing their positions little by little, and evaluated odors on the bases or the following:

A: No odor at all.

B: A slight odor, but without any particular problems.

C): An offensive odor.

Evaluation was organoleptically made according to a panel test form. As a result, very good results were obtained. The results are shown in Table 1. The resin composition A of the present invention can be applied to the surface treatment of paper by the means as described above, even when used as it is

| (1-2) Preparation of toner: | |
|---|---|
| Resin composition A (binder resin) | 100 parts |
| Magnetite particles (average particle diameter: 0.3μ; serving as both a magnetic material and a coloring agent) | 60 parts |
| Low-molecular polypropylene | 3 parts |
| Negatively chargeable monoazo dye (a charge controlling agent) | 1 part |

The above materials were mixed, and the mixture was thereafter hot-melted and kneaded at 120° C. using an extruder. After cooled, the kneaded product was pulverized and classified to give a negatively chargeable magnetic toner with a volume average particle diameter of 11 μ.

The resulting magnetic toner was analyzed to reveal that the content of benzaldehyde was not more than 0.002% by weight.

The negatively chargeable magnetic toner (100 parts) and 0.4% by weight of negatively chargeable colloidal silica (about 4 parts) were mixed to give magnetic toner having silica on its toner particle surfaces. The magnetic toner thus prepared was loaded into a modified machine of a laser beam printer LBP-SX, manufactured by Canon Inc., in which a corona charger was replaced with the contact charging roller 1 as shown in FIG. 1 in order to prevent generation or ozone, and also an ozone filter was removed. Printing was continuously carried out to obtain prints in solid black on the whole area, and odors generated in that case were observed.

The contact charging roller 1 had a diameter of 12 mm; its metallic core 1*c*, a diameter of 5 mm; its conductive rubber layer 1*b*, a thickness of about 3.5 mm; and the release film la formed of methoxymethylated nylon, a thickness of 20 μm. The Foiler 1 was pressed against the laminated-layer type OPC photosensitive member 2 at a total pressure of 1.2 kg (linear pressure: 55 g cm. A DC voltage (−700 V) and an AC voltage (300 Hz 1,500 $V_{pp}$) were applied to the contact charging roller 1 through the voltage applying means 3 so that the laminated-layer type OPC photosensitive member 2 was electrostatically charges and then an electrostatic image was formed using a laser beam. The magnetic toner on the developing sleeve was formed in a thickness of 130 μm, and the closest gap between the developing sleeve and the laminated-layer type OPC photosensitive member 2 was set to be 300 μm. The electrostatic image was developed to form a toner image, by a reversal development system while a DC bias (−500 V) and an AC bias (1,800 Hz, 1,600 $V_{pp}$) were applied to the developing sleeve. The toner image thus formed was electrostatically transferred to a plain paper. Thereafter, the toner image transferred was fixed on the plain paper by means of the heat roller having a surface temperature of 180° C.

Evaluation on odors was made in the following way: The above printer was placed at the center of a small room of about 3 m square, and reproductions were taken. On its surroundings, 10 panelists chosen at random smelled while they were changing their positions little by little, and evaluated odors in the same manner as in the above.

As a result, very good results were obtained, and the toner was judged to have no problem of odors (See Table 2).

Example 2

(2-1) Preparation of binder resin

In a reaction vessel, 200 parts of cumene was introduced, and heated to its reflux temperature. The following mixture was dropwise added thereto over a period of 4 hours under the reflux of cumene.

| Monomer mixture | Mixing proportion |
|---|---|
| Styrene monomer | 95 parts |
| α-Methylstyrene monomer | 5 parts |
| Di-tert-butyl peroxide | 8 parts |

Also under the reflux of cumene (146° C. to 156° C.), polymerization was completed and then the cumene was removed. The resulting styrene/α-methylstyrene copolymer had an Mw of 4,500, an Mw/Mn of 2.8, a main peak at a molecular weight of 4,400 in the chart of GPC, and a Tg of 63° C.

The above styrene/α-methylstyrene copolymer in an amount of 30 parts was dissolved in the following monomer mixture to give a mixed solution.

| Monomer mixture | Mixing proportion |
|---|---|
| Styrene monomer | 55 parts |
| n-Ethylhexyl acrylate monomer | 15 parts |
| Divinylbenzene | 0.3 part |
| Benzoyl peroxide | 1.3 parts |

In the above mixed solution, 170 parts of water with a dissolved oxygen of about 1.8 mg/lit. in which 0.1 part of partially saponified polyvinyl alcohol was dissolved was added to give a suspension dispersion. In a reaction vessel, 15 parts of water was put, and the dissolved oxygen in water was made be in a concentration of about 1.8 mg/lit. in the same manner as in Example 1. Similarly, the above suspension dispersion was added in the reaction vessel, and the reaction was carried out at reaction temperatures of from 70° to 95° C. for 9 hours. After completion of the reaction, the reaction mixture was filtered, dehydrated and dried to give a resin composition B comprised of styrene/α-methylstyrene copolymer and a styrene/2-hexyl acrylate copolymer.

In the resulting resin composition B, the THF-insoluble matter was in an amount of 32% by weight. The molecular weight distribution of the THF-soluble matter was measured to reveal that it had peaks at molecular weights of 5,000 and 42,000, respectively, an Mn of 6,200, an Mw of 130,000, and an Mw/Mn of 21. The component with a molecular weight of not more than 10,000 was in an amount of 20% by weight. It was also confirmed that the Tg of the resin composition was 58° C.

The content of benzaldehyde in the resin composition B was 0.004% by weight, and that of styrene monomers was 0.035% by weight.

Using the above resin composition B, tests were carried out in the same manner as in Example 1 to obtain good results.

(2-2) Preparation of toner

A magnetic toner was prepared in the same manner as in Example 1, except that the resin composition was replaced with the resin composition B. As a result, good results were similarly obtained.

The content of benzaldehyde in the toner was confirmed to be 0.003% by weight.

Example 3

(3-1) Preparation of binder resin

In a reaction vessel, 200 parts of cumene was introduced, and heated to its reflux temperature. The following mixture was dropwise added thereto over a period of 4 hours under the reflux of cumene.

| Monomer mixture | Mixing proportion |
|---|---|
| Styrene monomer | 90 parts |
| Methyl methacrylate monomer | 10 parts |
| Di-tert-butyl peroxide | 8 parts |

Also under the reflux of cumene (146° C. to 156° C.), polymerization was completed and then the cumene was removed. The resulting styrene methyl methacrylate copolymer had an Mw of 3,900, an Mw Mn of 2.6, a main peak at a molecular weight of 4,100, and a Tg of 60° C.

The above styrene methyl methacrylate copolymer in an amount of 40 parts was dissolved in the following monomer mixture to give a mixed solution.

| Monomer mixture | Mixing proportion |
|---|---|
| Styrene monomer | 38 parts |
| n-Butyl methacrylate monomer | 22 parts |
| Divinylbenzene | 0.24 part |
| Benzoyl peroxide | 0.60 part |
| tert-Butylperoxy-2-ethylhexanoate | 0.80 part |

In the above mixed solution, 170 parts of water with a dissolved oxygen of about 1.8 mg/lit. in which 0.1 part of partially saponified polyvinyl alcohol was dissolved was added to give a suspension dispersion. In a reaction vessel, 15 parts of water was out, and the dissolved oxygen in water was made to be in a concentration of about 1.8 mg/lit. in the same manner as in Example 1. Similarly, the above suspension dispersion was added in the reaction vessel, and the reaction was carried out at reaction temperatures of from 70° to 95° C. for 9 hours. After completion of the reaction, the reaction mixture was filtered dehydrated and dried to give a resin composition C comprised of styrene/methyl methacrylate copolymer and a styrene/n-butyl methacrylate copolymer.

In the resulting resin composition C, the insoluble matter was in an amount of 35% by weight. The molecular weight distribution of the THF-soluble matter was measured to reveal that it had peaks at molecular weights of 4,000 and 43,000, respectively, an Mn of 5,900, an Mw of 92,000, and an Mw/Mn of 16. The component with a molecular weight of not more than 10,000 was in an amount of 32% by weight. It was also confirmed that the Tg of the resin composition C was 60° C.

The content of benzaldehyde in the resin composition C was not more than 0.003% by weight, and that of styrene monomers was 0.021% by weight. Evaluation on odors was made in the same manner as in Example 1 to obtain good results.

(3-2) Preparation of toner

A magnetic toner was prepared in the same manner as in Example 1, except that the resin composition was replaced with the resin composition C and the temperature for hot-melt kneading in the extruder was changed to 100° C. As a result, some panelists perceived a slight odor, but judged it to be of no particular problem.

The content of benzaldehyde in the toner in that case was confirmed to be 0.005% by weight.

EXAMPLE 4

(4-1) Preparation of binder resin

| Monomer mixture | Mixing proportion |
|---|---|
| Styrene monomer | 55 parts |
| n-Butyl acrylate monomer | 15 parts |
| Divinylbenzene | 0.14 part |
| tert-Butylperoxy-2-ethylhexanoate | 1.5 parts |

In the above mixed solution, 170 parts of water with a dissolved oxygen of about 1.5 mg/lit. in which 0.1 part of partially saponified polyvinyl alcohol was dissolved was added to give a suspension dispersion. In a reaction vessel, 15 parts of water was put, and the dissolved oxygen in water was made to be in a concentration of about 1.5 mg/lit. in the same manner as in Example 1. Similarly, the above suspension dispersion was added in the reaction vessel, and the reaction was carried out at reaction temperatures of from 70° to 95° C. for 9 hours. After completion of the reaction, the reaction mixture was filtered, dehydrated and dried to give a resin composition D comprised of a styrene/n-butyl acrylate copolymer.

In the resulting resin composition D, the THF-insoluble matter was in an amount of 44% by weight. The molecular weight distribution of the THF-soluble matter was measured to reveal that it had a peak at a molecular weight of 20,000, an Mn of 8,000, an Mw of 28,000, and an Mw, Mn of 3.5. The component with a molecular weight of not more than 10,000 was in an amount of 21% by weight. It was also confirmed that the Tg of the resin composition D was 56° C.

The content of benzaldehyde in the resin composition D was not more than 0.003% by weight, and that of styrene monomers was 0.024% by weight. Evaluation on odors was made in the same manner as in Example 1 to obtain good results, although fusing or fixing properties to paper was slightly poor.

(4-2) Preparation of toner

A magnetic toner was prepared in the same manner as in Example 1, except that the resin composition was replaced with the resin composition D. Evaluation was also made. As a result, a solid black image obtained was tolerable to practical use, but fixing properties was slightly poor. In respect or the odor, however, similarly good results were obtained.

The content of benzaldehyde in the toner was confirmed to be 0.003% by weight.

Example 5

Evaluation of a panel test form was made in the same manner as in Example 1, except that the corona charger of the printer LBP-SX was not changed and the ozone filter only was removed. As a result, although the odor of aldehyde was little pointed out, some panelists perceived the odor of ozone. The toner, however, was judged to be good for practical use.

Comparative Example 1

(1) Preparation of binder resins

In a reaction vessel, 200 parts of cumene was introduced, and heated to its reflux temperature. A mixture of 100 parts of styrene monomers and 8 parts of di-tert-butyl peroxide was dropwise added thereto over a period of 4 hours under the reflux of cumene. Also under the reflux of cumene (146° C. to 156° C.), polymerization was completed and then the cumene was removed. The resulting polystyrene was capable of dissolving in THF, and had an Mw of 3,700, an Mw/Mn or 2.64, a main peak at a molecular weight of 3,500 as measured by GPC and a Tg of 57° C.

The above polystyrene in an amount of 30 parts was dissolved in the following monomer mixture to give a mixed solution.

| Monomer mixture | Mixing proportion |
|---|---|
| Styrene monomer | 54 parts |
| n-Butyl acrylate monomer | 16 parts |
| Divinylbenzene | 0.3 part |
| Benzoyl peroxide | 1.3 parts |

In the above mixed solution, 170 parts or water with a dissolved oxygen of about 3.5 mg/lit. in which 0.1 part of partially saponified polyvinyl alcohol was dissolved was added to give a suspension dispersion. In a reaction vessel, 15 parts of water was put, and the dissolved oxygen in water was made to be in a concentration of about 3.5 mg, lit., and suspension polymerization was carried out at reactor, temperatures of from 70° to 95° C. for 9 hours. After completion of the reaction, the reaction mixture was filtered, dehydrated and dried to give a comparative resin composition E comprised of polystyrene and a styrene/n-butyl acrylate copolymer.

The content of benzaldehyde in the above comparative resin composition E was 0.019% by weight, and that of styrene monomers was 0.07% by weight. As a result of a panel test carried out in the same manner as in Example 1, many panelists perceived an odor and considered it offensive, and the resin composition was judged to be no good for its application in the surface processing of paper.

(2-2) Preparation of toner

Example 1 was repeated, except that the resin composition was replaced with the comparative resin composition E. As a result, many panelists perceives an odor and considered it offensive, and the toner was judged to be no good for practical use.

The content of benzaldehyde in the toner in that case was confirmed to be 0.009% by weight.

Comparative Example 2

(1) Preparation of binder resin

In a reaction vessel, 200 parts of cumene was introduced, and heated to its reflux temperature. A mixture of 100 parts of styrene monomers and 8 parts of di-tert-butyl peroxide was dropwise added thereto over period of 4 hours under the reflux of cumene. Also under the reflux of cumene (146° C. to 156° C.), polymerization was completed and then the cumene was removed. The resulting polystyrene was capable of dissolving in THF, and had an Mw of 3,700, an Mw/Mn of 2.64, a main peak at a molecular weight of 3,500 as measured by GPC, and a Tg of 57° C.

The above polystyrene in an amount of 30 parts was dissolved in the following monomer mixture to give a mixed solution.

| Monomer mixture | Mixing proportion |
|---|---|
| Styrene monomer | 54 parts |
| n-Butyl acrylate monomer | 16 parts |
| Divinylbenzene | 0.3 part |
| Benzoyl peroxide | 1.3 parts |

In the above mixed solution, 170 parts of water with a dissolved oxygen of about 2.8 mg/lit/ in which 0.1 part of partially saponified polyvinyl alcohol was dissolved was added to give a suspension dispersion. In a reaction vessel, 15 parts of water was put, and the dissolved oxygen in water was made be in a concentration of about 2.8 mg/lit., and the reaction was carried out at reaction temperatures or from 70° to 95° C. for 9 hours. After completion of the reaction, the reaction mixture was filtered, dehydrated and dried to give a comparative resin composition F comprised of polystyrene and a styrene/n-butyl acrylate copolymer.

The content of benzaldehyde in the above comparative resin composition F was 0.015% by weight, and that of styrene monomers was 0.03% by weight. As a result of a panel test carried out in the same manner as in Example 1, the resin composition was judged to be no good as in Comparative Example 1.

(2) Preparation of toner

Example 1 was repeated, except that the resin composition used was replaced with the comparative resin composition F. As a result, the toner was judged to be no good as in Comparative Example 1.

The content of benzaldehyde in the toner in that case was confirmed to be 0.007% by weight.

EXAMPLE 6

In a reaction vessel, 150 parts of cumene was introduced, and heated to its reflux temperature. The following mixture was dropwise added thereto over a period of 4 hours under the reflux of cumene.

| Monomer mixture | Mixing proportion |
|---|---|
| Styrene monomer | 100 parts |
| Di-tert-butyl peroxide | 4 parts |

Also under the reflux of cumene (146° C. to 156° C.), polymerization was completed and then the cumene was removed. The resulting styrene methyl methacrylate copolymer had an Mw of 6,900, an Mw Mn cf 2.3, a main peak at a molecular weight of 7,100, and a Tg of 75° C.

The above styrene/methyl methacrylate copolymer in an amount of 30 parts was dissolved in the following monomer mixture to give a mixed solution.

| Monomer mixture | Mixing proportion |
|---|---|
| Styrene monomer | 52 parts |
| n-Butyl acrylate monomer | 18 parts |
| Divinylbenzene | 0.3 part |
| Benzoyl peroxide | 0.9 part |
| tert-Butylperoxy-2-ethylhexanoate | 0.7 part |

In the above mixed solution, 170 parts of water with a dissolved oxygen of about 2.3 mg/lit. in which 0.1 part of partially saponified polyvinyl alcohol was dissolved was added to give a suspension dispersion. In a reaction vessel, 15 parts of water was put, and the dissolved oxygen in water was made be in a concentration of about 2.3 mg/lit. in the same manner as in Example 1. The above suspension dispersion was added in the reaction vessel, and the reaction was carried out at reaction temperatures or from 70° to 95° C. for 9 hours. After completion of the reaction, the reaction mixture was filtered, dehydrated and dried to give a resin composition G comprised of a styrene polymer and a styrene/n-butyl acrylate copolymer.

In the resulting resin composition G, the THF-insoluble matter was in an amount of 30% by weight. The molecular weight distribution of the THF-soluble matter was measured to reveal that it had peaks at molecular weights of 7,500 and 43,000, respectively, an Mn of 6,500, an Mw of 100,000, and an Mw/Mn of 15. The component with a molecular weight of not more than 10,000 was in an amount of 18% by weight. It was also confirmed that the Tg of the resin composition was 61° C. The content of benzaldehyde in the resin composition G was 0.008% by weight, and that of styrene monomers was 0.056% by weight.

An odor test on the above resin composition was carried out in the same manner as in Example 1. As a result, some panelists perceived an odor, but the resin composition was judged to be good for practical use.

Results of panel tests on odors, carried out in Examples and Comparative Examples are shown below in Tables 1 and 2.

TABLE 1

Evaluation on odors of binder resins

| | Example | | | | | Comparative example | |
|---|---|---|---|---|---|---|---|
| | 1 | 2 | 3 | 4 | 6 | 1 | 2 |
| Resin composition: | | | | | | | |
| | A | B | C | D | G | E | F |
| Evaluation: | | | | | | | (persons) |
| (A): | 9 | 7 | 8 | 8 | 5 | 2 | 3 |
| (B): | 1 | 3 | 2 | 2 | 5 | 3 | 3 |
| (C): | 0 | 0 | 0 | 0 | 1 | 5 | 4 |
| Overall judgement: | | | | | | | |
| | Good | Good | Good | Good | Good | No good | No good |

TABLE 2

Evaluation on odors of toners

| | Example | | | | | Comparative example | |
|---|---|---|---|---|---|---|---|
| | 1 | 2 | 3 | 4 | 5 | 1 | 2 |
| Resin composition: | | | | | | | |
| | A | B | C | D | A | E | F |
| Evaluation: | | | | | | | (persons) |
| (A): | 10 | 8 | 6 | 8 | 5 | 2 | 3 |
| (B): | 0 | 2 | 4 | 2 | 5 | 2 | 3 |
| (C): | 0 | 0 | 0 | 0 | 0 | 6 | 4 |
| Overall judgement: | | | | | | | |
| | Good | Good | Good | Good | Good | No good | No good |

With wide spread of electrophotography, toners are required also to have good properties against odors that may be generated at the time of fusing or fixing by heat. The present inventors made intensive studies so that such requirement can be met. As a result, they have discovered that the amount of oxidized products of polymerizable monomers remaining in a binder resin for a toner, in particular, the amount of aldehydes remaining therein has a great influence, and have reached a finding that, for the achievement of a decrease thereof, it is necessary to control the amount of dissolved oxygen in the water used when suspension polymerization is carried out.

The binder resin for a toner that has been synthesized through such measures brings about very good results on odors. Thus they have made it possible to provide a suspension polymerization resin and a toner which are free from the problem of odors.

We claim:

1. An apparatus unit comprising an electrostatically chargeable member for supporting thereon an electrostatic image, a means for electrostatically charging the chargeable member, and a developing means for developing an electrostatic image supported on said chargeable member; wherein said developing means has a toner for developing an electrostatic image, comprising a styrene type binder resin and a coloring agent; wherein an aldehyde is contained in said toner in an amount of not more than 0.005% by weight based on a weight of the toner, and said charging means and developing means are integrally held together with said chargeable member to form a unit so that a single unit capable of being freely mounted on and detected from an apparatus main body is formed.

2. The apparatus unit according to claim 1, wherein said styrene type binder resin contains THF-insoluble matter.

3. The apparatus unit according to claim 1, wherein said styrene type binder resin comprises a cross-linked styrene polymer or styrene copolymer or a mixture thereof.

4. The apparatus unit according to claim 1, wherein said styrene type binder resin contains THF-insoluble matter and contains an aldehyde in an amount of not more than 0.1% by weight based on the weight of the styrene type binder resin.

5. The apparatus unit according to claim 4, wherein said styrene type binder resin comprises a cross-linked styrene resin and contains an aldehyde in an amount of not more than 0.005% by weight based on the weight of the styrene type binder resin.

6. The apparatus unit according to claim 5, wherein said aldehyde comprises benzaldehyde.

7. The apparatus unit according to claim 1, wherein said styrene type binder resin comprises a styrene polymer or styrene copolymer prepared by suspension polymerization, or a mixture thereof.

8. The apparatus unit according to claim 1, wherein said aldehyde is contained in an amount of not more than 0.004% by weight based on the weight of the toner.

9. The apparatus unit according to claim 1, wherein said coloring agent comprises a magnetic material.

10. The apparatus unit according to claim 9, wherein said magnetic material is contained in an amount of from 30 to 150 parts by weight based on 100 parts by weight of the binder resin.

11. The apparatus unit according to claim 9, wherein said magnetic material is contained in an amount of from 40 to 100 parts by weight based on 100 parts by weight of the binder resin.

12. The apparatus unit according to claim 1, wherein said coloring agent comprises at least one of a dye and a pigment.

13. The apparatus unit according to claim 12, wherein said coloring agent is contained in an amount of from 5 to 20% by weight based on the weight of the binder resin.

14. The apparatus unit according to claim 1, wherein said styrene type binder resin is cross-linked with divinylbenzene.

15. The apparatus unit according to claim 1, wherein said styrene type binder resin comprises a styrene/acrylate copolymer.

16. The apparatus unit according to claim 1, wherein said styrene type binder resin comprises a styrene/methacrylate copolymer.

17. The apparatus unit according to claim 1, wherein said styrene type binder resin contains from 10 to 70% by weight of a THF-insoluble matter.

18. The apparatus unit according to claim 1, wherein said styrene type binder resin contains from 10 to 60% by weight of THF-insoluble matter.

19. The apparatus unit according to claim 1, wherein said binder resin (i) has a weight average molecular weight/number average molecular weight (Mw/Mn) of $\geqq 5$, at least one peak in the region of a molecular weight of from 2,000 to 10,000 and at least one peak or shoulder in the region of a molecular weight of from 15,000 to 100,000 in the molecular weight distribution measured by gel permeation chromatography of a THF-soluble matter in the binder resin, and (ii) contains a component with a molecular weight of not more than 10,000 in an amount of from 10 to 50% by weight based on the THF-soluble resin composition.

20. The apparatus unit according to claim 19, wherein said binder resin contains from 10 to 70% by weight of a THF-insoluble matter.

21. The apparatus unit according to claim 19, wherein said binder resin contains from 10 to 60% by weight of a THF-insoluble matter.

22. The apparatus unit according to claim 19, wherein said binder resin comprises a styrene type binder resin cross-linked with a cross-linking agent the cross-linked styrene type binder resin is prepared by suspension polymerization.

23. The apparatus unit according to claim 1, wherein said binder resin comprises a styrene type binder resin containing coproduced benzaldehyde contaminant having an undesired odor, wherein said benzaldehyde is contained in said toner in an amount of not more than 0.005% by weight based on the weight of the toner.

24. The apparatus unit according to claim 1, wherein said styrene binder resin contains THF-insoluble matter, and contains benzaldehyde in an amount of not more than 0.01% by weight based on the weight of the styrene binder resin.

25. The apparatus unit according to claim 24, wherein said styrene binder resin comprises a cross-linked styrene resin and contains benzaldehyde in an amount of not more than 0.005% by weight based on the weight of the cross-linked styrene resin.

26. The apparatus unit according to claim 1, wherein said binder resin has a wight average molecular weight/number average molecular weight (Mw/Mn) of ≧5, at least one peak in the region of a molecular weight of from 2,000 to 10,000 and at least one peak or shoulder in the region of a molecular weight of from 15,000 to 100,000 in the molecular weight distribution measured by gel permeation chromatography of a THF-soluble matter in the binder resin.

27. The apparatus unit according to claim 1, wherein the means for electrostatically charging the chargeable member is a contact charging assembly.

28. The apparatus unit according to claim 1, wherein the means for electrostatically charging the chargeable member is a charging roller.

29. The apparatus unit according to claim 1, wherein the electrostatically chargeable member for supporting thereon an electrostatic image is a photosensitive drum and the means for electrostatically charging the chargeable member is a contact charging assembly.

30. The apparatus unit according to claim 1, wherein the electrostatically chargeable member for supporting thereon an electrostatic image is a photosensitive drum and the means for electrically charging the chargeable member is a charging roller.

31. A facsimile apparatus comprising an electrophotographic apparatus and a means for receiving image information from a remote terminal wherein said electrophotographic apparatus comprises:

an electrostatically chargeable member for supporting thereon an electrostatic image, a means for electrostatically charging the chargeable member, and a developing means for developing an electrostatic image supported on said chargeable member; wherein said developing means has a toner for developing an electrostatic image comprising a styrene type binder resin and a coloring agent; wherein an aldehyde is contained in said toner in an amount of not more than 0.005% by weight based on a weight of the toner.

32. The facsimile apparatus according to claim 31, wherein said styrene type binder resin contains a THF-insoluble matter.

33. The facsimile apparatus according to claim 31, wherein said styrene type binder resin comprises a cross-linked styrene polymer or styrene copolymer, or a mixture thereof.

34. The facsimile apparatus according to claim 31, wherein said styrene type binder resin contains a THF-insoluble matter and contains an aldehyde in an amount of not more than 0.01% by weight based on the weight of the styrene-type binder resin.

35. The facsimile apparatus according to claim 34, wherein said styrene type binder resin comprises a cross-linked styrene resin and contains an aldehyde in an amount of not more than 0.005% by weight based on the weight of the styrene-type binder resin.

36. The facsimile apparatus according to claim 35, wherein said aldehyde comprises benzaldehyde.

37. The facsimile apparatus according to claim 31, wherein said styrene type binder resin comprises a styrene polymer or styrene copolymer prepared by suspension polymerization, or a mixture thereof.

38. The facsimile apparatus according to claim 31, wherein said aldehyde is contained in an amount of not more than 0.004% by weight based on the weight of the toner.

39. The facsimile apparatus according to claim 31, wherein said coloring agent comprises a magnetic material.

40. The facsimile apparatus according to claim 39, wherein said magnetic material is contained in an amount of from 30 to 150 parts by weight based on 100 parts by weight of the binder resin.

41. The facsimile apparatus according to claim 39, wherein said magnetic material is contained in an amount of from 40 to 100 parts by weight based on 100 parts by weight of the binder resin.

42. The facsimile apparatus according to claim 31, wherein said coloring agent comprises at least one of a dye and a pigment.

43. The facsimile apparatus according to claim 42, wherein said coloring agent is contained in an amount of from 5 to 20% by weight based on the weight of the binder resin.

44. The facsimile apparatus according to claim 31, wherein said styrene type binder resin is cross-linked with divinylbenzene.

45. The facsimile apparatus according to claim 31, wherein said styrene type binder resin comprises a styrene/acrylate copolymer.

46. The facsimile apparatus according to claim 31, wherein said styrene type binder resin comprises a styrene/methacrylate copolymer.

47. The facsimile apparatus according to claim 31, wherein said binder resin contains from 10 to 70% by weight of a THF-insoluble matter.

48. The facsimile apparatus according to claim 31, wherein said binder resin contains from 10 to 60% by weight of THF-insoluble matter.

49. The facsimile apparatus according to claim 31, wherein said binder resin (i) has a weight average molecular weight/number average molecular weight (Mw/Mn) of ≧5, at least one peak in the region of a molecular weight of from 2,000 to 10,000 and at least one peak or shoulder in the region of a molecular weight of from 15,000 to 100,000 in the molecular weight distribution measured by gel permeation chromatography of a THF-soluble matter in the binder resin, and (ii) contains a component with a molecular weight of not more than 10,000 in an amount of from 10 to 50% by weight based on the THF-soluble resin composition.

50. The facsimile apparatus according to claim 49, wherein said binder resin contains from 10 to 70% by weight of a THF-insoluble matter.

51. The facsimile apparatus according to claim 49, wherein said binder resin contains from 10 to 60% by weight of a THF-insoluble matter.

52. The facsimile apparatus according to claim 49, wherein said binder resin comprises a styrene type binder resin cross-linked with a cross-linking agent and the cross-linked styrene type binder resin is prepared by suspension polymerization.

53. The facsimile apparatus according to claim 31, wherein said binder resin comprises a styrene type binder resin containing coproduced benzaldehyde contaminant having an undesired odor, wherein said benzaldehyde is contained in said toner in an amount of not more than 0.005% by weight based on the weight of the toner.

54. The facsimile apparatus according to claim 31, wherein said styrene binder resin contains THF-insoluble matter and contains benzaldehyde in an amount of not more than 0.01% by weight based on the weight of the styrene binder resin.

55. The facsimile apparatus according to claim 54, wherein said styrene binder resin comprises a cross-linked styrene resin and contains benzaldehyde in an amount of nor more than 0.005% by weight based on the weight of the cross-linked styrene resin.

56. The facsimile apparatus according to claim 31, wherein said binder resin has a weight average molecular weight/number average molecular weight (Mw/Mn) of ≧5, at least one peak in the region of a molecular weight of from 2,000 to 10,000 and at least one peak or shoulder in the region of a molecular weight of from 15,000 to 100,000 in the molecular weight distribution measured by gel permeation chromatography of a THF-soluble matter in the binder resin.

57. The facsimile apparatus according to claim 31, wherein the means for electrostatically charging the chargeable member is a contact charging assembly.

58. The facsimile apparatus according to claim 31, wherein the means for electrostatically charging the chargeable member is a charging roller.

59. The facsimile apparatus according to claim 31, wherein the electrostatically chargeable member for supporting thereon an electrostatic image is a photosensitive drum and the means for electrostatically charging the chargeable member is a charging assembly.

60. The facsimile apparatus according to claim 31, wherein the electrostatically chargeable member for supporting thereon an electrostatic image is a photosensitive drum and the means for electrostatically charging the chargeable member is a charging roller.

61. An image forming method comprising the steps of:

electrostatically charging a chargeable member for supporting thereon an electrostatic image;

forming an electrostatic image on the chargeable member;

forming the electrostatic image on the chargeable member to form a toner image with a toner comprising a styrene binder resin and a coloring agent, wherein an aldehyde is contained in said toner in an amount of not more than 0.005% by weight based on a weight of the toner;

transferring the toner image to a transfer paper; and fixing the toner image on the transfer paper by applying heat and pressure to the toner image.

62. The image forming method according to claim 16, including the step of employing a contact charging assembly to electrostatically charge the chargeable member.

63. The image forming method according to claim 62, including the step of employing a contact charging roller to electrostatically charge the chargeable member.

64. The image forming method according to claim 62, including the step of employing a photosensitive drum as the chargeable member for supporting thereon an electrostatic image and a contact charging assembly to electrostatically charge the chargeable member.

65. The image forming method according to claim 62, including the step of employing a photosensitive drum as the chargeable member for supporting thereon an electrostatic image and a contact charging roller to electrostatically charge the chargeable member.

66. The image forming method according to claim 62, including the step of fixing the toner image on the transfer paper employing a heat-pressure roller fixing unit.

67. The image forming method according to claim 61, wherein said styrene binder resin contains THF-insoluble matter.

68. The image forming method according to claim 66, wherein said styrene binder resin comprises a cross-linked styrene polymer or styrene copolymer or a mixture thereof.

69. The image forming method according to claim 61, wherein said styrene binder resin contains THF-insoluble matter and contains an aldehyde in an amount of not more than 0.01% by weight based on the weight of the styrene binder resin.

70. The image forming method according to claim 69, wherein said styrene binder resin comprises a cross-linked styrene resin and contains an aldehyde in an amount of not more than 0.005% by weight based on the weight of the styrene binder resin.

71. The image forming method according to claim 70, wherein said aldehyde comprises benzaldehyde.

72. The image forming method according to claim 61, wherein said styrene binder resin comprises a styrene polymer or a styrene copolymer prepared by suspension polymerization or a mixture thereof.

73. The image forming method according to claim 61, wherein said aldehyde is contained in an amount of not more than 0.004% by weight based on the weight of the toner.

74. The image forming method according to claim 61, wherein said coloring agent comprises a magnetic material.

75. The image forming method according to claim 74, wherein said magnetic material is present in an amount of from 30 to 150 parts by weight based on 100 parts by weight of the binder resin.

76. The image forming method according to claim 74, wherein said magnetic material is present in an amount of from 40 to 100 parts by weight based on 100 parts by weight of the binder resin.

77. The image forming method according to claim 61, wherein said coloring agent comprises at least one of a dye a pigment.

78. The image forming method according to claim 77, wherein said coloring agent is present in an amount of from 5 to 20% by weight based on the weight of the binder resin.

79. The image forming method according to claim 61, wherein said styrene binder resin is cross-linked with divinylbenzene.

80. The image forming method according to claim 16, wherein said styrene binder resin comprises a styrene-acrylate copolymer.

81. The image forming method according to claim 61, wherein said styrene binder resin comprises a styrene-methacrylate copolymer.

82. The image forming method according to claim 61, wherein said styrene binder resin contains from 10 to 70% by weight of THF-insoluble matter.

83. The image forming method according to claim 61, wherein said styrene binder resin contains from 10 to 60% by weight of a THF-insoluble matter.

84. The image forming method according to claim 61, wherein said binder resin (i) has a weight average molecular weight/number average molecular weight (Mw/Mn) of ≧5, at least one peak in the region of a molecular weight of from 2,000 to 10,000 and at least the peak or shoulder in the region of a molecular weight of from 15,000 to 100,000 in the molecular weight distribution measured by gel permeation chromatography of a THF-soluble matter in the binder resin, and (ii) contains a component with a molecular weight of not more than 10,000 in an amount of from 10 to 50% by weight based on the THF-soluble resin composition.

85. The image forming method according to claim 84, wherein said binder resin contains from 10 to 70% by weight of a THF-insoluble matter.

86. The image forming method according to claim 84, wherein said binder resin contains from 10 to 60% by weight of a THF-insoluble matter.

87. The image forming method according to claim 84, wherein said binder resin comprises a styrene binder resin cross-linked with a cross-linking agent and the cross-linked styrene binder resin is prepared by suspension polymerization.

88. The image forming method according to claim 61, wherein said binder resin comprises a styrene binder resin containing coproduced benzaldehyde contaminant having an undesired odor, wherein said benzaldehyde is present in said toner in an amount of not more than 0.005% by weight based on the weight of the toner.

89. The image forming method according to claim 61, wherein said binder resin contains THF-insoluble matter and contains benzaldehyde in an amount of not more than 0.1% by weight based on the weight of the styrene binder resin.

90. The image forming method according to claim 89, wherein said styrene binder resin comprises a cross-linked styrene resin and contains benzaldehyde in an amount of not more than 0.005% by weight based on the weight of the cross-linked styrene resin.

91. The image forming method according to claim 61 wherein said binder resin has a weight average molecular weight/number average molecular weight (Mw/Mn) of ≧5, at least one peak in a region of a molecular weight of from 2,000 to 10,000 and at least one peak or shoulder in a region of a molecular weight of from 15,000 to 10,000 in the molecular weight distribution measured by gel permeation chromatography of a THF-soluble matter in the binder resin.

* * * * *

UNITED STATES PATENT AND TRADEMARK OFFICE

CERTIFICATE OF CORRECTION

PATENT NO. : 5,333,059

DATED : July 26, 1994

INVENTOR(S) : YOSHIHIKO HYOSU, ET AL.

It is certified that error appears in the above-identified patent and that said Letters Patent is hereby corrected as shown below:

COLUMN 1

Line 11, "invention" should read --Invention--.
Line 58, "copy-" should read --(or copy- --.

COLUMN 2

Line 11, "zone" should read --or ozone--.
Line 67, "when" should be deleted and "of" (first occurrence) should be deleted.

COLUMN 4

Line 25, "comprising" should read --comprising:--.
Line 47, "comprising" should read --comprising:--.

COLUMN 6

Line 15, "amount" should read --amount of--.
Line 16, "becomes" should read --is--.
Line 55, "4 1 μl." should read --4 μl.--.
Line 65, "curve" should read --curve:--.

COLUMN 7

Line 13, "proposes" should read --proposed--.
Line 16, "weight number" should read --weight/number--.
Line 42, "THE" should read --THF--.

COLUMN 8

Line 2, "insoluble" should read --insoluble in--.
Line 43, "Denks" should read --Denko--.

CERTIFICATE OF CORRECTION

PATENT NO. : 5,333,059

DATED : July 26, 1994

INVENTOR(S) : YOSHIHIKO HYOSU, ET AL.

It is certified that error appears in the above-identified patent and that said Letters Patent is hereby corrected as shown below:

COLUMN 8

Line 52, "responding" should read --corresponding--.
Line 54, "or" should read --of--.
Line 65, "toner" should read --toner of--.

COLUMN 9

Line 4, "vinyl toluene," should read --vinyltoluene,--.
Line 7, "octyi" should read --octyl--.
Line 11, "metnyi" should read --methyl--.
Line 12, "prepyl" should read --propyl--.
Line 14, "octyl" should read --octyl--.
Line 61, "include" should read --includes--.

COLUMN 10

Line 3, "triallyl isocyanurate," (second occurrence) should read --triallyl trimellitate,--.
Line 66, "in these" should be deleted.

COLUMN 11

Line 33, "kinds," should read --kind,--.
Line 34, "they are" should read --it is--.

COLUMN 12

Line 38, "C.I.42000)." should read --(C.I.42000).--.
Line 40, "exemplifeied" should read --exemplified--.
Line 41, "tungstomolybdophosphoris" should read --tungstomolybdophosphoric--.

UNITED STATES PATENT AND TRADEMARK OFFICE
CERTIFICATE OF CORRECTION

PATENT NO. : 5,333,059

DATED : July 26, 1994

INVENTOR(S) : YOSHIHIKO HYOSU, ET AL.

It is certified that error appears in the above-identified patent and that said Letters Patent is hereby corrected as shown below:

COLUMN 12

Line 43, "black 3" should read --Black 3-- and "Hanza" should read --Hansa--.
Line 46, "quarternary" should read --quaternary--.
Line 51, "quar-" should read --qua- --.

COLUMN 13

Line 24, "be" (second occurrence) should be deleted.
Line 38, "give" should read --to give a--.

COLUMN 14

Line 5, "toner" should read --toner of--.
Line 7, "in which" should read --using--.
Line 55, "abut" should read --about--.

COLUMN 15

Line 31, "fine surface" should read --(the surface--.
Line 34, "drum" should read --drum is--.
Line 42, "residul" should read --residual--.

COLUMN 17

Line 3, "next" should read --the next--.
Line 18, "ever" should read --over--.
Line 25, ";number" should read --/number-- and "(Mw, Mn)" should read --(Mw/Mn)--.
Line 44, "fees" should read --feed--.

UNITED STATES PATENT AND TRADEMARK OFFICE

CERTIFICATE OF CORRECTION

PATENT NO. : 5,333,059

DATED : July 26, 1994

INVENTOR(S) : YOSHIHIKO HYOSU, ET AL.

It is certified that error appears in the above-identified patent and that said Letters Patent is hereby corrected as shown below:

COLUMN 18

Line 23, "De" should read --be--.
Line 45, "is" should read --is.--.
Line 58, "cooled," should read --cooling,--.

COLUMN 19

Line 5, "or" should read --of--.
Line 13, "Foiler 1" should read --roller 1--.
Line 15, "55 g cm." should read --55 g/cm.--.
Line 16, "(300 Hz" should read --(300 Hz,--.
Line 20, "charges" should read --charged--.

COLUMN 20

Line 30, "composition" should read --composition B--.
Line 63, "Mw Mn" should read --Mw/Mn--.

COLUMN 21

Line 13, "out," should read --put,--.
Line 20, "filtered" should read --filtered,--.
Line 24, "insoluble" should read --THF-insoluble--.

COLUMN 22

Line 11, "Mw, Mn" should read --Mw/Mn--.
Line 27, "was" should read --were--..
Line 28, "or" should read --of--.
Line 32, "Example 5" should read --EXAMPLE 5--.
Line 65, "or" should read --of--.

UNITED STATES PATENT AND TRADEMARK OFFICE

CERTIFICATE OF CORRECTION

PATENT NO. : 5,333,059
DATED : July 26, 1994
INVENTOR(S) : YOSHIHIKO HYOSU, ET AL.

It is certified that error appears in the above-identified patent and that said Letters Patent is hereby corrected as shown below:

COLUMN 23

Line 4, "reactor," should read --reaction--.
Line 21, "perceives" should read --perceived--.
Line 32, "period" should read --a period--.
Line 52, "2.8 mg/lit/" should read --2.8 mg/lit.--.

COLUMN 24

Line 23, "styrene methyl" should read --styrene/methyl--.
Line 24, "Mw Mn cf" should read --Mw/Mn of--.
Line 47, "or" should read --of--.
Line 61, "composition" should read --composition G--.
Line 65, "composition" should read --composition G--.

COLUMN 25

Line 53, "comprising" should read --comprising:--.

COLUMN 26

Line 2, "detected" should read --detached--.
Line 14, "0.1%" should read --0.01%--.
Line 62, "of" should read --of a--.

COLUMN 27

Line 36, "wight" should read --weight--.
Line 58, "electrically" should read --electrostatically--.
Line 62, "terminal" should read --terminal,--.

UNITED STATES PATENT AND TRADEMARK OFFICE

CERTIFICATE OF CORRECTION

PATENT NO. : 5,333,059
DATED : July 26, 1994
INVENTOR(S) : YOSHIHIKO HYOSU, ET AL.

It is certified that error appears in the above-identified patent and that said Letters Patent is hereby corrected as shown below:

COLUMN 28

Line 5, "image" should read --image,--.

COLUMN 29

Line 3, "of" should read --of a--.
Line 43, "nor" should read --not--.

COLUMN 30

Line 9, "forming" should read --developing--.
Line 18, "claim 16," should read --claim 61,--.
Line 42, "claim 66," should read --claim 61,--.

COLUMN 31

Line 11, "dye" should read --dye and--.
Line 19, "claim 16," should read --claim 61,--.
Line 27, "of" should read --of a--.

UNITED STATES PATENT AND TRADEMARK OFFICE

CERTIFICATE OF CORRECTION

PATENT NO. : 5,333,059

DATED : July 26, 1994

INVENTOR(S) : YOSHIHIKO HYOSU, ET AL.

It is certified that error appears in the above-identified patent and that said Letters Patent is hereby corrected as shown below:

COLUMN 32

Line 30, "claim 61" should read --claim 61,--.

Signed and Sealed this

Twenty-first Day of February, 1995

Attest:

Bruce Lehman

BRUCE LEHMAN

Attesting Officer

*Commissioner of Patents and Trademarks*